United States Patent
Miyake

(10) Patent No.: US 9,291,080 B2
(45) Date of Patent: Mar. 22, 2016

(54) EXHAUST PURIFICATION SYSTEM OF INTERNAL COMBUSTION ENGINE

(71) Applicant: Teruhiko Miyake, Suntou-gun (JP)

(72) Inventor: Teruhiko Miyake, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/006,143

(22) PCT Filed: Feb. 27, 2013

(86) PCT No.: PCT/JP2013/055207
§ 371 (c)(1),
(2) Date: Sep. 19, 2013

(87) PCT Pub. No.: WO2014/132365
PCT Pub. Date: Sep. 4, 2014

(65) Prior Publication Data
US 2015/0361851 A1    Dec. 17, 2015

(51) Int. Cl.
*B01D 53/94* (2006.01)
*F01N 3/18* (2006.01)
*F01N 3/20* (2006.01)
*F02D 41/02* (2006.01)

(52) U.S. Cl.
CPC .......... *F01N 3/2073* (2013.01); *B01D 53/9431* (2013.01); *B01D 53/9495* (2013.01); *F02D 41/0235* (2013.01); *B01D 2255/10* (2013.01)

(58) Field of Classification Search
None
See application file for complete search history.

(56) References Cited

U.S. PATENT DOCUMENTS

2012/0131908 A1    5/2012  Bisaiji et al.

FOREIGN PATENT DOCUMENTS

| JP | 2010019092 A | * | 1/2010 |
| JP | A 2010-19092 | | 1/2010 |
| JP | A 2010-261345 | | 11/2010 |
| WO | WO 2011/114499 A1 | | 9/2011 |

* cited by examiner

*Primary Examiner* — Walter D Griffin
*Assistant Examiner* — Jelitza Perez
(74) *Attorney, Agent, or Firm* — Oliff PLC

(57) ABSTRACT

In an internal combustion engine, a hydrocarbon feed valve (15) and an exhaust purification catalyst (13) are arranged in an engine exhaust passage. As rich control for making the air-fuel ratio of the exhaust gas which flows into the exhaust purification catalyst (13) rich, cylinder rich control for generating rich air-fuel ratio combustion gas in the cylinder and exhaust rich control for feeding hydrocarbons from the hydrocarbon feed valve (15) to make air-fuel ratio of the exhaust gas rich are used. When the air-fuel ratio of the exhaust gas which flows into the exhaust purification catalyst should be made rich, if the speed of the vehicle is lower than a predetermined speed and the gear position of the transmission is at a predetermined low speed gear position, exhaust rich control is used instead of cylinder rich control.

16 Claims, 17 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges in an engine exhaust passage an $NO_X$ storage catalyst which stores $NO_X$ when the air-fuel ratio of exhaust gas is lean and releases the stored $NO_X$ when the air-fuel ratio of the exhaust gas is made rich, which arranges in the engine exhaust passage upstream of the $NO_X$ storage catalyst a hydrocarbon feed valve, which intermittently makes the air-fuel ratio of the exhaust gas which flows into the $NO_X$ storage catalyst rich when the $NO_X$ storage catalyst should release $SO_X$, and which uses, as rich control for making the air-fuel ratio of the exhaust gas which flows into the $NO_X$ storage catalyst rich, cylinder rich control which generates combustion gas of a rich air-fuel ratio in a cylinder and exhaust rich control which feeds hydrocarbons from the hydrocarbon feed valve so as to make the air-fuel ratio of the exhaust gas rich (for example, see Patent literature 1).

In this regard, when the $NO_X$ storage catalyst should release $SO_X$, it is necessary to maintain the temperature of the $NO_X$ storage catalyst at the 600° C. or higher $SO_X$ release temperature and in that state intermittently make the air-fuel ratio of the exhaust gas which flows into the $NO_X$ storage catalyst rich. In this case, if cylinder rich control is used as rich control for making the air-fuel ratio of the exhaust gas which flows into the $NO_X$ storage catalyst rich, the oxygen concentration in the exhaust gas which flows into the $NO_X$ storage catalyst falls, so the oxidation reaction is weakened and, therefore, the $NO_X$ storage catalyst falls in temperature. As opposed to this, if exhaust rich control is used, the engine exhausts a large amount of oxygen and the supplied hydrocarbons react with the large amount of oxygen, so the $NO_X$ storage catalyst rises in temperature. Therefore, in this engine, when the $NO_X$ storage catalyst falls in temperature, exhaust rich control is used, while when the $NO_X$ storage catalyst rises in temperature, cylinder rich control is used. By this, the air-fuel ratio of the exhaust gas which flows into the $NO_X$ storage catalyst is intermittently made rich while the temperature of the $NO_X$ storage catalyst is maintained at the $SO_X$ release temperature.

CITATIONS LIST

Patent Literature

Patent literature 1: Japanese Patent Publication No. 2010-19092A

SUMMARY OF INVENTION

Technical Problem

In this regard, cylinder rich control is performed by feeding additional fuel to a combustion chamber. At this time, the parameters are adjusted so that the output torque of the engine does not fluctuate, but in practice, if cylinder rich control is performed, the output torque of the engine fluctuates. Even if the output torque of the engine fluctuates in this way, when the vehicle is running at a high speed or when a gear position of the transmission is a high speed gear position, that is, when a speed ratio of the transmission is small, the vibration which is received from the road surface and the surrounding noise mask the fluctuations in the output torque of the engine. Therefore, the fluctuations in the output torque of the engine do not give the passengers an unpleasant feeling. As opposed to this, when the vehicle is running at a low speed or when the gear position of the transmission is at the low speed gear position, that is, when the speed ratio of the transmission is large, the vibration which is received from the road surface and the surrounding noise become lower, so the fluctuations in the output torque of the engine are transmitted to the passengers without being masked and therefore the fluctuations of the output torque of the engine give the passengers an unpleasant feeling.

An object of the present invention is to provide an exhaust purification system of an internal combustion engine which does not give the passengers an unpleasant feeling by making the air-fuel ratio of the exhaust gas which flows into the exhaust purification catalyst rich.

Solution to Problem

According to the present invention, there is provided an exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on an exhaust gas flow surface of the exhaust purification catalyst, basic exhaust gas flow surface parts are formed around the precious metal catalysts, the exhaust purification catalyst has a property of reducing $NO_X$ which is contained in an exhaust gas if making a concentration of hydrocarbons which flow into the exhaust purification catalyst vibrate by within a predetermined range of amplitude and by within a predetermined range of period and has a property of being increased in storage amount of $NO_X$ which is contained in the exhaust gas if making a vibration period of the hydrocarbon concentration longer than the predetermined range, wherein, as rich control for making an air-fuel ratio of the exhaust gas which flows into the exhaust purification catalyst rich, cylinder rich control for generating rich air-fuel ratio combustion gas in a cylinder and exhaust rich control for feeding hydrocarbons from the hydrocarbon, feed valve to make air-fuel ratio of the exhaust gas rich can be used, if a speed of a vehicle is lower than a predetermined speed when the air-fuel ratio of the exhaust gas which flows into the exhaust purification catalyst should be made rich, the exhaust rich control is performed if the exhaust rich control is possible, and, if the speed of the vehicle is larger than the predetermined speed when the air-fuel ratio of the exhaust gas which flows into the exhaust purification catalyst should be made rich, the cylinder rich control is performed if the cylinder rich control is possible.

Furthermore, according to the present invention, there is provided an exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on an exhaust gas flow surface of the exhaust purification catalyst, basic exhaust gas flow surface parts are formed around the precious metal catalysts, the exhaust purification catalyst has a property of reducing $NO_X$ which is contained in the exhaust gas if making the concentration of hydrocarbons which flow into the exhaust purification catalyst vibrate by within a predetermined range of amplitude and by within a predetermined range of period and has a property of being increased in storage amount of $NO_X$ which is contained in an exhaust gas if making a vibration period of the hydrocarbon concentration longer than the predetermined range, wherein, as rich control for making an air-fuel ratio of the exhaust gas which flows into the exhaust purification catalyst rich, cylinder rich control for generating rich air-fuel ratio combustion gas in a cylinder and exhaust rich control for feeding hydrocarbons from the hydrocarbon feed valve to make the air-fuel ratio of the exhaust gas rich can be used, if a speed ratio of a transmission is larger than a predetermined speed ratio when the air-fuel ratio of the exhaust gas which flows into the exhaust purification catalyst should be made rich, the exhaust rich control is performed if the exhaust rich control is possible, and, if the speed ratio of the transmission is smaller than the predetermined speed ratio when the air-fuel ratio of the exhaust gas which flows into the exhaust purification catalyst should be made rich, the cylinder rich control is performed if the cylinder rich control is possible.

Advantageous Effects of Invention

In the present invention, when the air-fuel ratio of the exhaust gas which flows into the exhaust purification catalyst should be made rich, if the speed of the vehicle is lower than a predetermined speed or the speed ratio of the transmission is greater than a predetermined speed ratio exhaust rich control is performed. This exhaust rich control does not cause fluctuations in the output torque of the engine, therefore does not give the passengers an unpleasant feeling at this time.

BRIEF DESCRIPTION OF DRAWINGS

FIGS. 24A and 25B are views which show engine operation regions in which a cylinder rich control and an exhaust rich control can be performed respectively.

DESCRIPTION OF EMBODIMENTS

Figure 1:
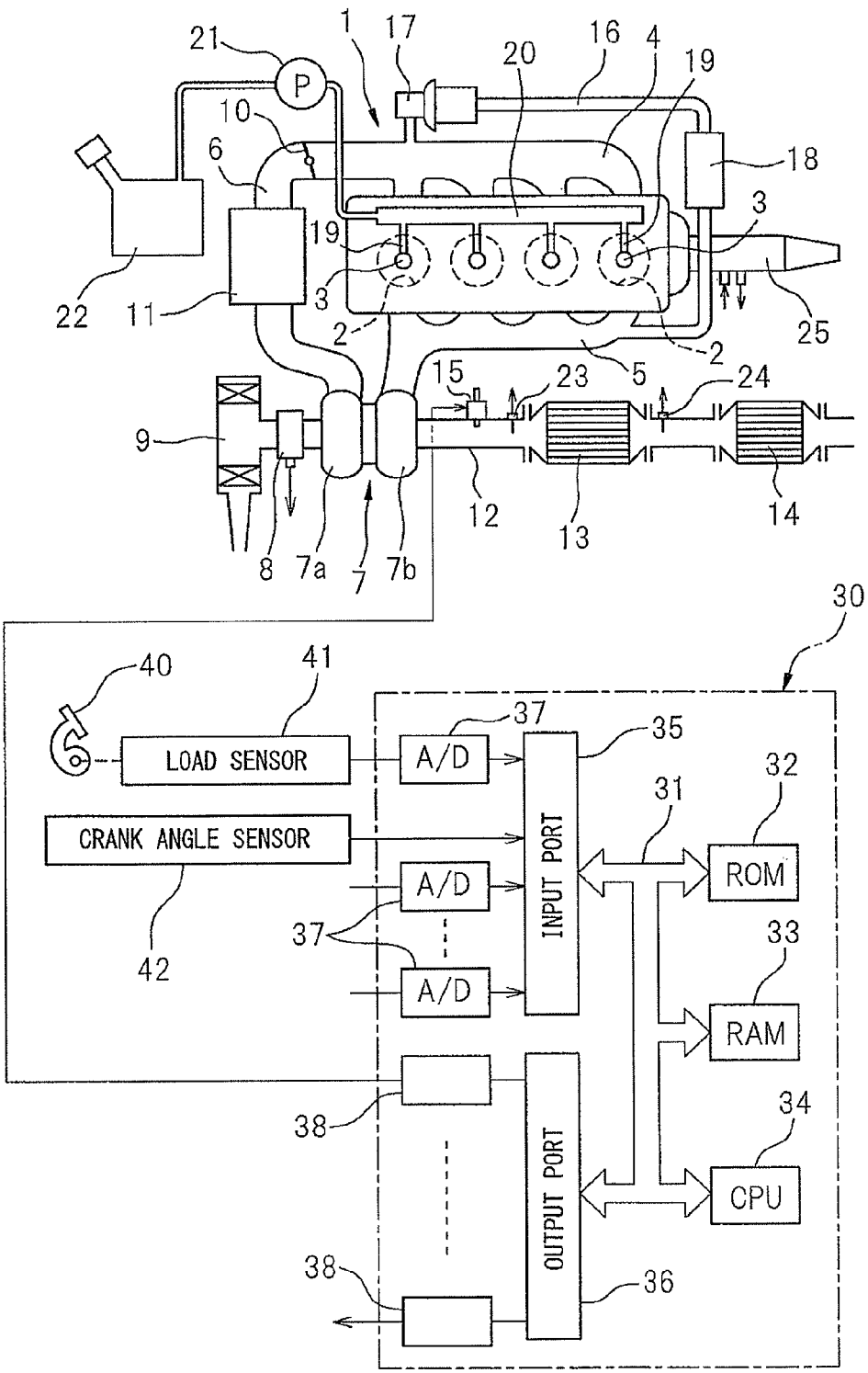
FIG. 1 is an overall view of a compression ignition type internal combustion engine.

FIG. 1 is an overall view of a compression ignition type internal combustion engine.
Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_X$ storage catalyst 13. An outlet of the exhaust purification catalyst 13 is connected to an inlet of a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3. In addition, as shown in FIG. 1, an automatic transmission is attached to the engine body 1. This automatic transmission 25 may be comprised of a gear transmission or a continuously variable transmission.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream of the exhaust purification catalyst 13, a temperature sensor 23 is arranged for detecting the temperature of the exhaust gas flowing into the exhaust purification catalyst 13. Downstream of the exhaust purification catalyst 13, a temperature sensor 24 is arranged for detecting the temperature of the exhaust gas flowing out from the exhaust purification catalyst 13. The output signals of these temperature sensor 23,24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21. The automatic transmission 25 is connected on one hand to the input port 35 via the corresponding AD converter 37 and on the other hand to the output port 36 via the corresponding drive circuit 38.

Figure 2:
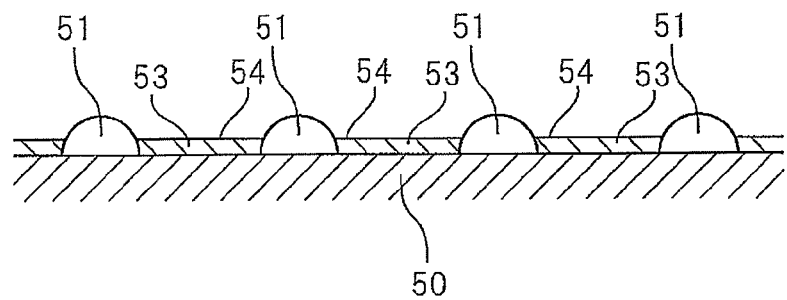
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
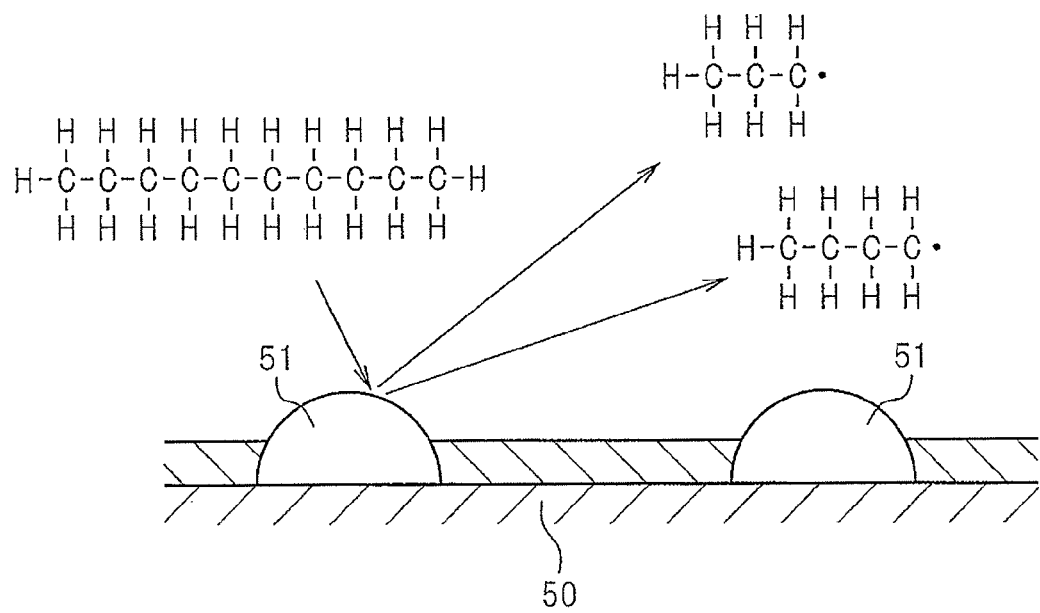
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
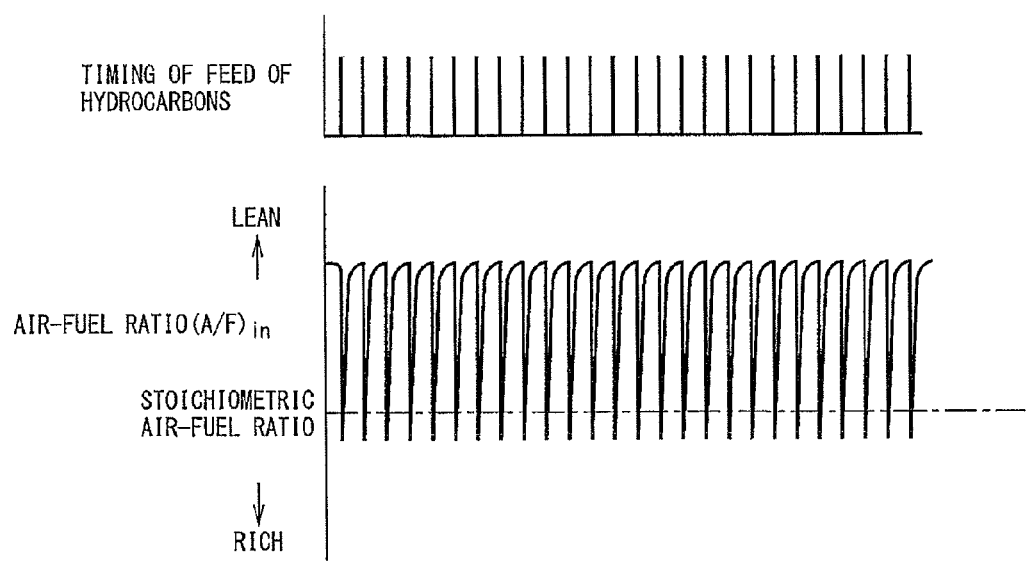
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
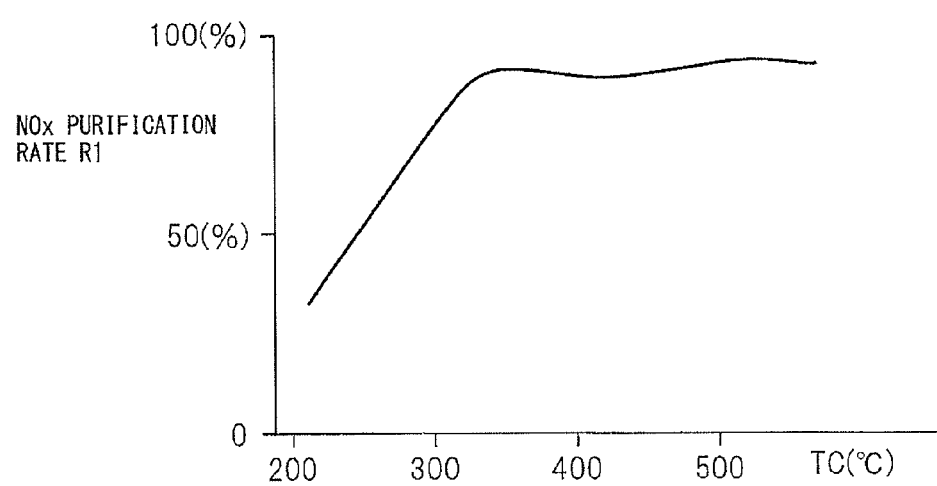
FIG. 5 is a view which shows an $NO_X$ purification rate R1.

FIG. 5 shows the $NO_X$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F) in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate R1 is obtained even in a 350° C. or higher high temperature region.

Figure 6A:
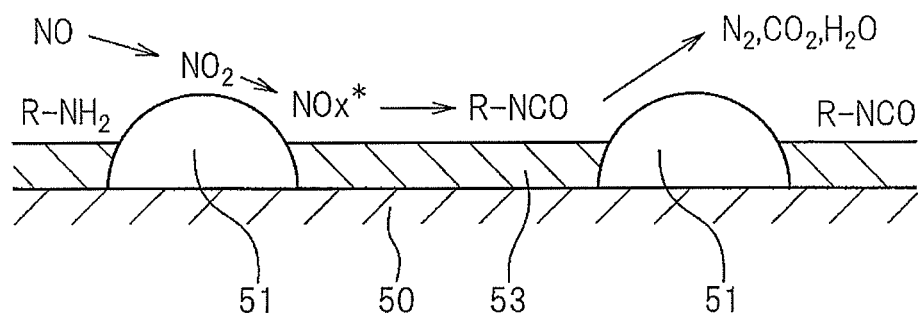
FIGS. 6A and 6B are views for explaining an oxidation reduction reaction in an exhaust purification catalyst.
Figure 6B:
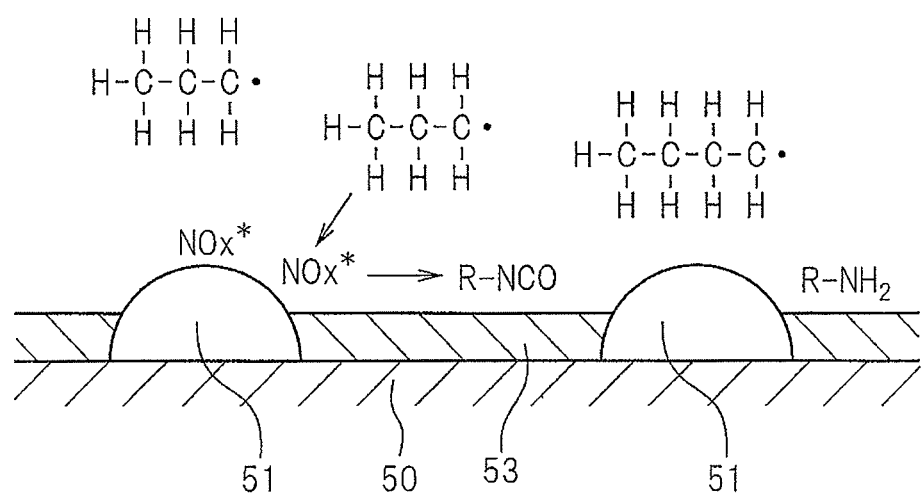

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_X$ in the exhaust gas, react with the active $NO_X^*$, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_X$ in the exhaust gas or the active $NO_X^*$ or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas or the active $NO_X^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas or the active $NO_X^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_X$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
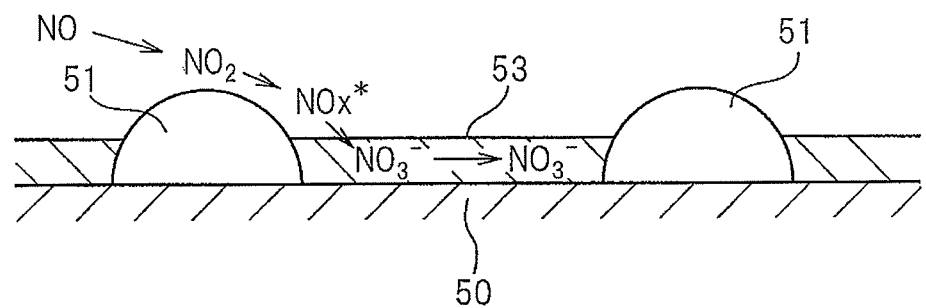
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_X^*$ which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
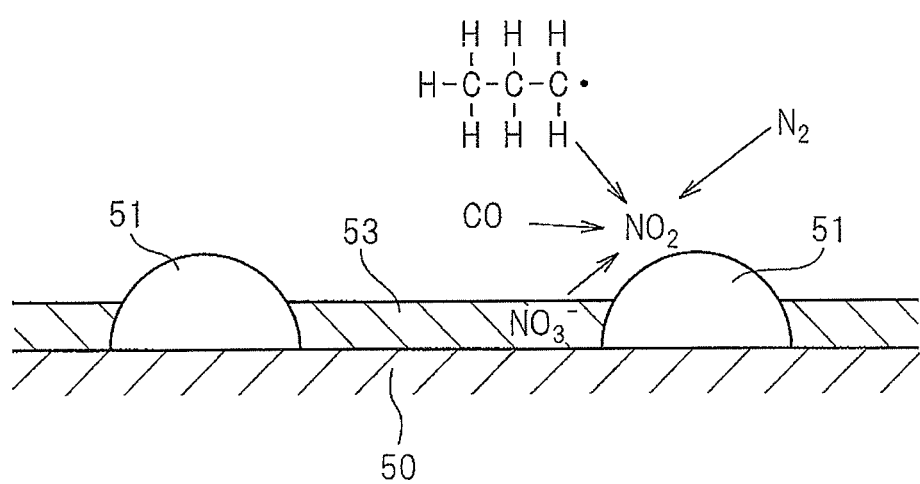

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
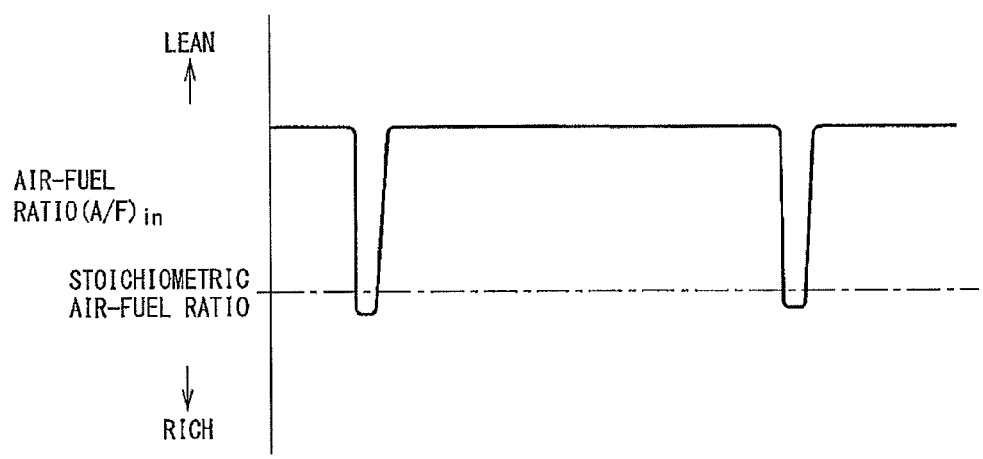
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
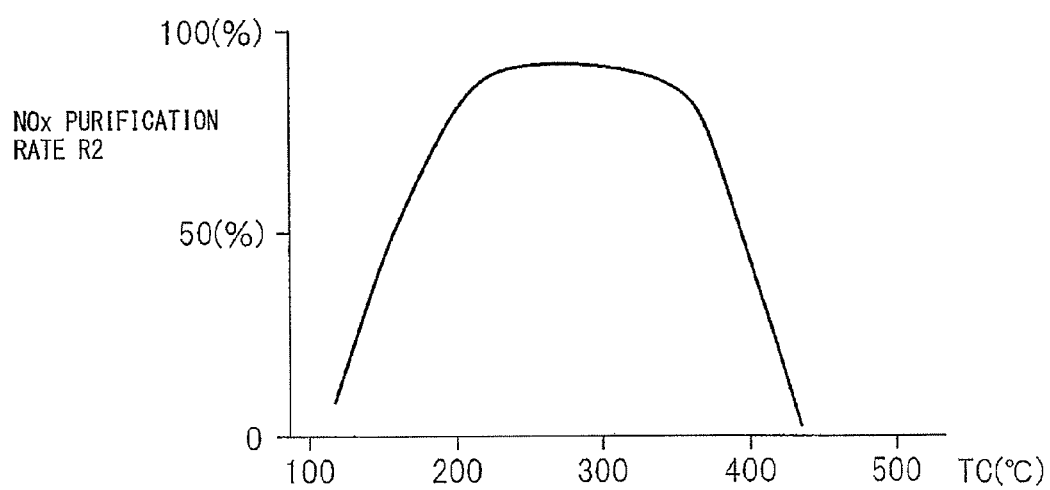
FIG. 9 is a view which shows an $NO_X$ purification rate R2.

FIG. 9 shows the $NO_X$ purification rate R2 when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 250° C. to 300° C., an extremely high $NO_X$ purification rate is obtained, but when the catalyst temperature TC becomes a 350° C. or higher high temperature, the $NO_X$ purification rate R2 falls.

In this way, when the catalyst temperature TC becomes 350° C. or more, the $NO_X$ purification rate R2 falls because if the catalyst temperature TC becomes 350° C. or more, $NO_X$ is less easily stored and the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate R2. However, in the new $NO_X$ purification method shown from FIG. 4 to FIGS. 6A and 6B, the amount of $NO_X$ stored in the form of nitrates is small, and consequently, as shown in FIG. 5, even when the catalyst temperature TC is high, a high $NO_X$ purification rate R1 is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, basic exhaust gas flow surface parts 54 are formed around the precious metal catalysts 51, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming so much nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become smaller in amount compared with the case where making the exhaust purification catalyst 13 function as an $NO_X$ storage catalyst. Note that, this new $NO_X$ purification method will be referred to below as the "first $NO_X$ purification method".

Figure 10:
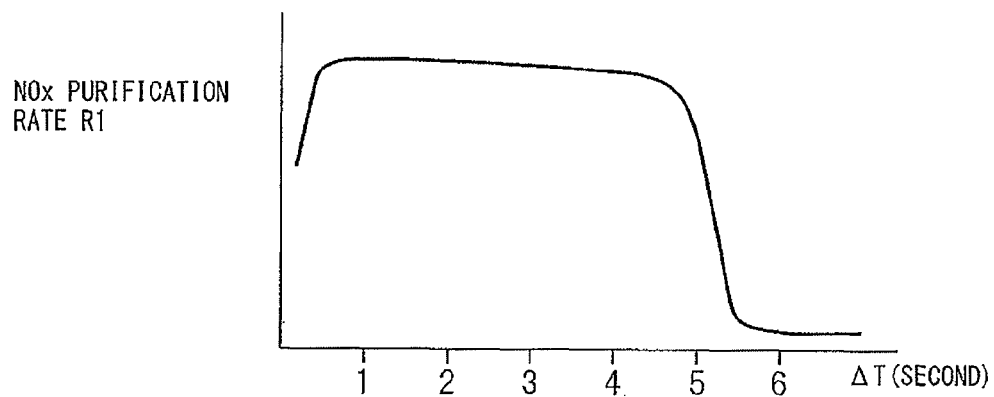
FIG. 10 is a view which shows a relationship between a vibration period $\Delta T$ of hydrocarbon concentration and an $NO_X$ purification rate R1.

Now, as mentioned before, if the injection period $\Delta T$ of the hydrocarbons from the hydrocarbon feed valve 15 becomes longer, the time period in which the oxygen concentration around the active $NO_X^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_X^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_X$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_X$ purification rate R1 falls. Therefore, in the embodiment according to the present invention, the injection period of the hydrocarbons is made from 0.3 second to 5 seconds.

Figure 11A:
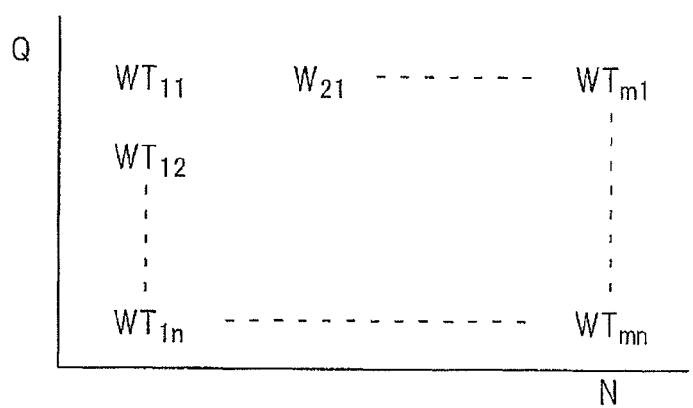
FIGS. 11A and 11B are views which show maps of the injection amount of hydrocarbons etc.
Figure 11B:
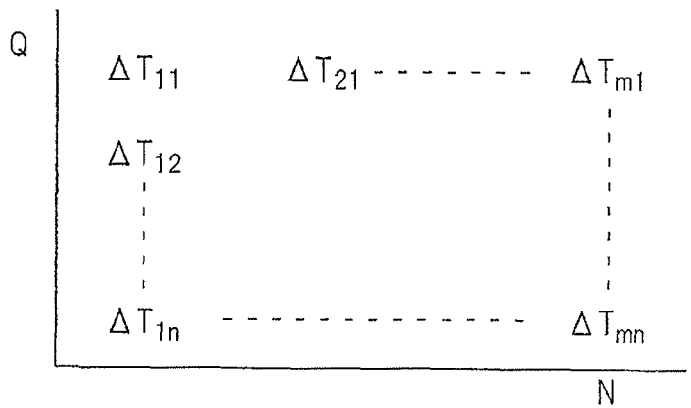

Now, in the embodiment according to the present invention, when the $NO_X$ purification action by the first $NO_X$ purification method is performed, by controlling the injection amount and injection timing of hydrocarbons from the hydrocarbon feed valve 15, the air-fuel ratio (A/F) in of the exhaust gas flowing into the exhaust purification catalyst 13 and the injection period $\Delta T$ of the hydrocarbons are controlled so as to become the optimal values for the engine operating state. In this case, in the embodiment according to the present invention, the optimum hydrocarbon injection amount WT when the $NO_X$ purification action by the first $NO_X$ purification method is performed is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 12:
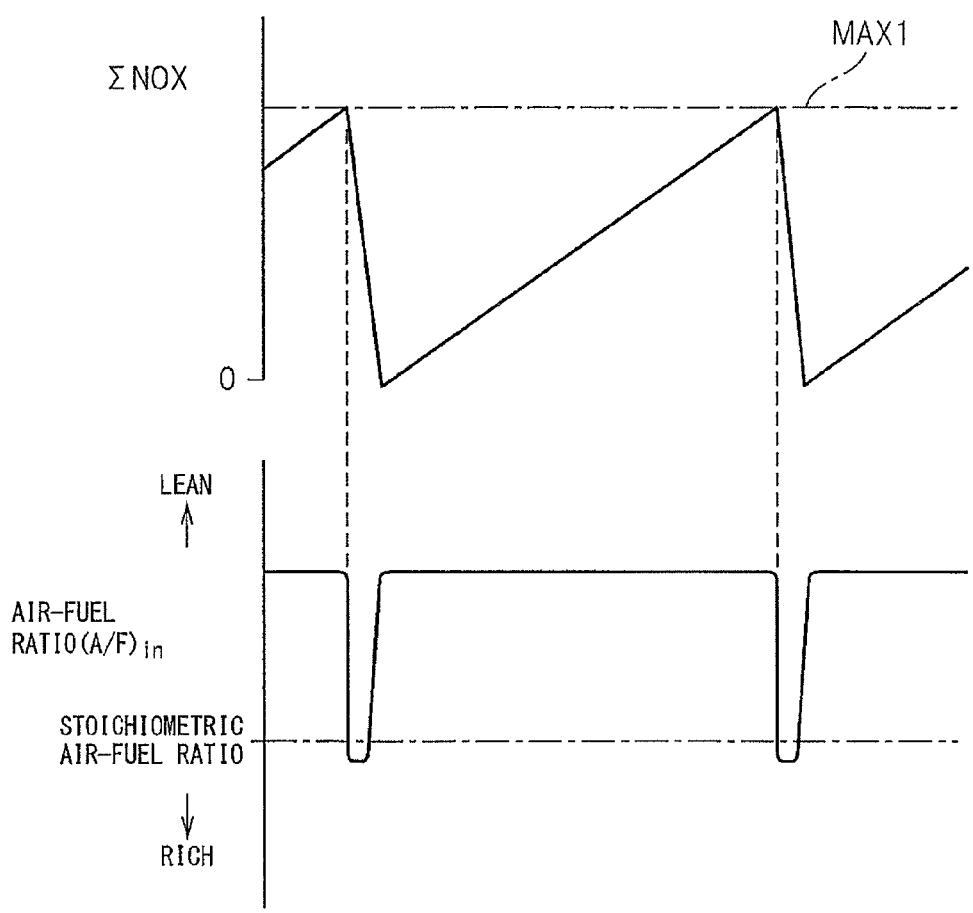
FIG. 12 is a view which shows an $NO_X$ release control.

In this second $NO_X$ purification method, as shown in FIG. 12, when the stored $NO_X$ amount $\Sigma NO_X$ of $NO_X$ which is stored in the basic layer 53 exceeds a first predetermined allowable amount MAX 1, the air-fuel ratio (A/F) in of the exhaust gas flowing into the exhaust purification catalyst 13 is temporarily made rich. If the air-fuel ratio (A/F) in of the exhaust gas is made rich, the $NO_X$ which was stored in the basic layer 53 when the air-fuel ratio (A/F) in of the exhaust gas was lean is released from the basic layer 53 all at once and reduced. Due to this, the $NO_X$ is removed.

Figure 13:
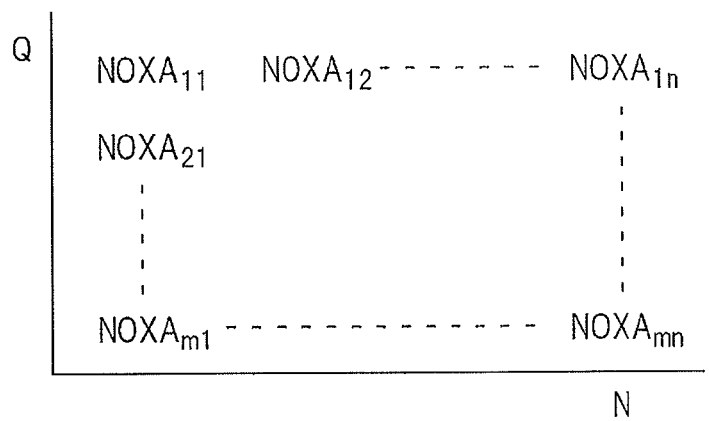
FIG. 13 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 13 in advance in the ROM 32. The stored $NO_X$ amount $\Sigma NO_X$ is calculated from this exhausted $NO_X$ amount NOXA. In this case, as explained before, the period at which the air-fuel ratio (A/F) in of the exhaust gas is made rich is usually 1 minute or more.

Figure 14:
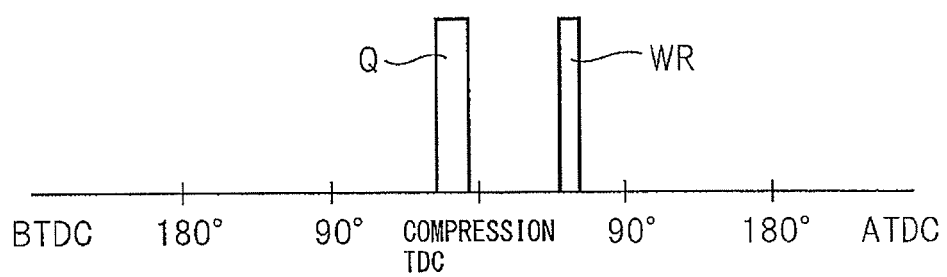
FIG. 14 is a view which shows a fuel injection timing.
Figure 15:
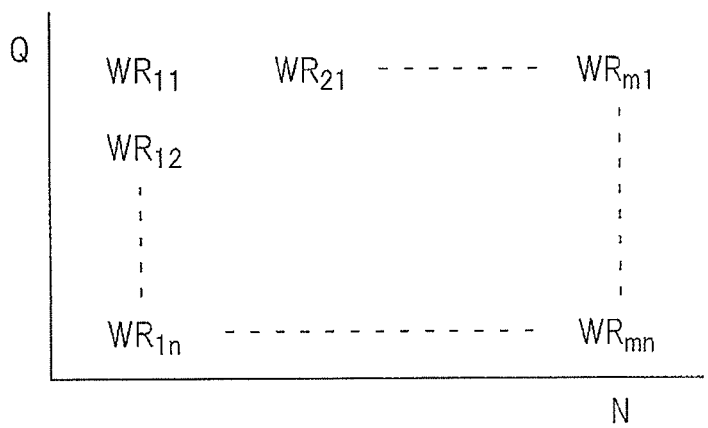
FIG. 15 is a view which shows a map of an additional hydrocarbon feed amount WR.

In this second $NO_X$ purification method, as shown in FIG. 14, by injecting an additional fuel WR into each combustion chamber 2 from the fuel injector 3 in addition to the combustion-use fuel Q, the air-fuel ratio (A/F) in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 15 in advance in the ROM 32. In this way, in case where the second $NO_X$ purification method is performed, when the air-fuel ratio (A/F) in of the exhaust gas flowing into the exhaust purification catalyst 13 should be made rich, the air-fuel ratio (A/F) in of the exhaust gas discharged from the combustion chamber 2 is made rich by feeding the additional fuel WR to the combustion chamber 2.

In this regard, in this case, as explained above, the additional fuel WR which is fed into the combustion chamber 2 is made to burn inside the combustion chamber 2. Therefore, inside the combustion chamber 2, at this time, rich air-fuel ratio combustion gas is generated. In the present invention, rich control which makes rich air-fuel ratio combustion gas be generated inside the cylinder and thereby makes the air-fuel ratio of the exhaust gas which flows into the exhaust purification catalyst 13 rich in this way is called "cylinder rich control". On the other hand, it is also possible to feed hydrocarbons from a hydrocarbon feed valve 15 to the exhaust gas to make the air-fuel ratio of the exhaust gas which flows into the exhaust purification catalyst 13 rich. In the present invention, rich control which feeds hydrocarbons from the hydrocarbon feed valve 15 to make the air-fuel ratio of the exhaust gas which flows into the exhaust purification catalyst 13 rich is called "exhaust rich control". In this embodiment according to the present invention, as the rich control for making the air-fuel ratio of the exhaust gas which flows into the exhaust purification catalyst 13 rich, cylinder rich control for generating rich air-fuel ratio combustion gas in the cylinder and exhaust rich control for feeding hydrocarbons from the hydrocarbon feed valve 15 to make the air-fuel ratio of the exhaust gas rich are selectively used.

Figure 16:
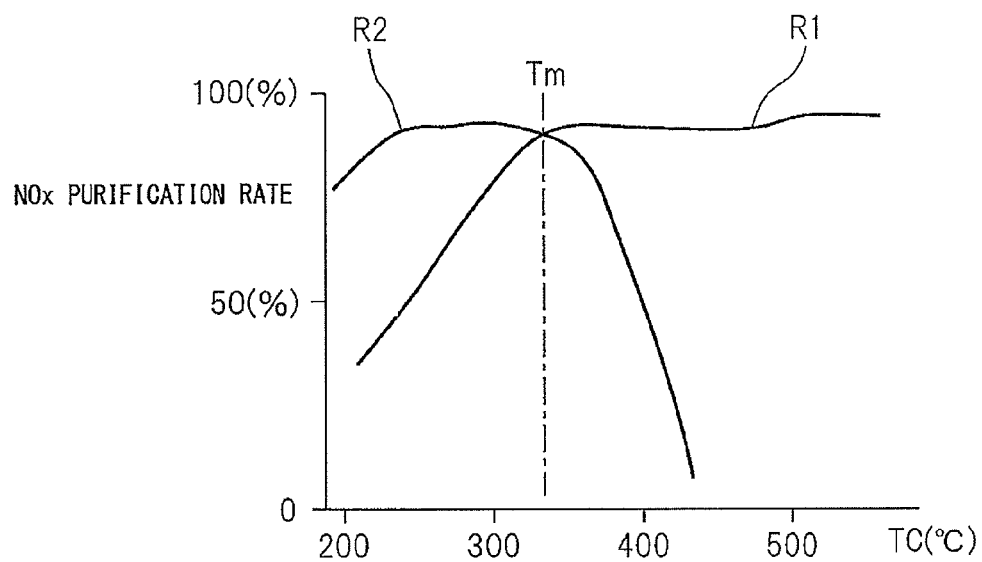
FIG. 16 is a view which shows an $NO_X$ purification rate R1 and an $NO_X$ purification rate R2.

FIG. 16 shows together the $NO_X$ purification rate R1 when an $NO_X$ removal action is performed by the first $NO_X$ removal method and an $NO_X$ purification rate R2 when an $NO_X$ removal action is performed by the second $NO_X$ removal method. Note that, in FIG. 16, Tm shows the temperature TC of the exhaust purification catalyst 13 when the $NO_X$ purification rate R1 and the $NO_X$ purification rate R2 become equal. In this embodiment according to the present invention, when the catalyst temperature TC is lower than Tm, an $NO_X$ removal action by the second $NO_X$ removal method where the higher $NO_X$ purification rate R2 is obtained is performed, while when the catalyst temperature TC is higher than Tm, an $NO_X$ removal action by the first $NO_X$ removal method where the higher $NO_X$ purification rate R1 is obtained is performed.

In this regard, as explained above, even when the $NO_X$ removal action by the first $NO_X$ removal method is performed, the exhaust purification catalyst 13 stores $NO_X$, though in a small amount. In this case, if the amount of storage of $NO_X$ increases, the exhaust gas flow surface parts 54 of the exhaust purification catalyst 13 weaken in basicity and can no longer generate and hold reducing intermediates well. As a result, the $NO_X$ purification rate R1 falls. Therefore, when the $NO_X$ removal action by the first $NO_X$ removal method is performed, it is necessary to make the exhaust purification catalyst 13 release $NO_X$ when the amount of storage of $NO_X$ increases. In this case, if making the air-fuel ratio of the exhaust gas which flows into the exhaust purification catalyst 13 rich, it is possible to make the exhaust purification catalyst 13 release $NO_X$. Therefore, in this embodiment according to the present invention, when the $NO_X$ storage amount which is stored in the exhaust purification catalyst 13 exceeds a predetermined second allowable value MAX2 which is smaller than the first allowable value MAX1, the air-fuel ratio of the exhaust gas which flows into the exhaust purification catalyst 13 is made rich to make the exhaust purification catalyst 13 release $NO_X$.

On the other hand, the exhaust purification catalyst 13 stores not only $NO_X$, but also the $SO_X$ which is contained in exhaust gas. In this case, if the amount of storage of $SO_X$ in the exhaust purification catalyst 13 increases, both the $NO_X$ purification rate R1 and $NO_X$ purification rate R2 fall. That is, when the $NO_X$ removal action by the first $NO_X$ removal method is performed, even if the amount of storage of $SO_X$ increases, the exhaust gas flow surface parts 54 of the exhaust purification catalyst 13 weaken in basicity and can no longer generate and hold reducing intermediates well. As a result, the $NO_X$ purification rate R1 falls. On the other hand, when the $NO_X$ removal action by the second $NO_X$ removal method is performed, if the amount of storage of $SO_X$ increases, the amount of $NO_X$ which the exhaust purification catalyst 13 can store decreases. As a result, the $NO_X$ purification rate R2 falls. Therefore, both when the $NO_X$ removal action by the first $NO_X$ removal method is performed and when the $NO_X$ removal action by the second $NO_X$ removal method is performed, it is necessary to make the exhaust purification catalyst 13 release $SO_X$ when the amount of storage of $SO_X$ increases.

Note that, if raising the temperature TC of the exhaust purification catalyst 13 to the 600° C. or higher $SO_X$ release temperature and making the air-fuel ratio of the exhaust gas which flows into the exhaust purification catalyst 13 rich in a state where the temperature TC of the exhaust purification catalyst 13 is maintained at the 600° C. or higher $SO_X$ release temperature, it is possible to make the exhaust purification catalyst 13 release $SO_X$. Therefore, in this embodiment according to the present invention, when the amount of storage of $SO_X$ which is stored in the exhaust purification catalyst 13 exceeds a predetermined allowable value SMAX, the air-fuel ratio of the exhaust gas which flows into the exhaust purification catalyst 13 is intermittently made rich to raise the temperature TC of the exhaust purification catalyst 13 to the $SO_X$ release temperature. Note that, fuel contains a certain ratio of sulfur. Therefore, in this embodiment according to the present invention, the amount of storage of $SO_X$ which is stored in the exhaust purification catalyst 13 is calculated from the cumulative amount of the fuel which is fed.

Now then, in this embodiment according to the present invention, when making the air-fuel ratio of the exhaust gas which flows into the exhaust purification catalyst 13 rich, it is possible to use either cylinder rich control which makes the cylinder generate rich air-fuel ratio combustion gas and exhaust rich control which makes the hydrocarbon feed valve 15 feed hydrocarbons to make the air-fuel ratio of the exhaust gas rich. In this regard, in cylinder rich control, additional combustion is used to make the air-fuel ratio rich, so when cylinder rich control is performed, the exhaust gas which is exhausted from the engine contains a large amount of CO or light HC or other such strong reduction reducing ingredients. If the exhaust gas contains such strong reduction reducing ingredients, the exhaust purification catalyst 13 releases the $NO_X$ or $SO_X$ well and the $NO_X$ or $SO_X$ is reduced well. Therefore, when making the exhaust purification catalyst 13 release $NO_X$ or $SO_X$, usually cylinder rich control is used.

In this regard, this cylinder rich control, as explained above, is performed by feeding additional fuel to the combustion chamber 2. At this time, the injection timing of the main injection and the amount of EGR gas are adjusted so that the output torque of the engine does not fluctuate. However, even if adjusted so that the output torque of the engine does not fluctuate when cylinder rich control is performed, at this time, actually the output torque of the engine fluctuates. In this case, even if the output torque of the engine fluctuates, when the vehicle is running at a high speed or when the gear position of the transmission 25 is at the high speed gear position, that is, when the speed ratio of the transmission is small, the vibration which is received from the road surface or the surrounding noise cause the fluctuations in the output torque of the engine to be masked. Therefore, the fluctuations in the output torque of the engine will not give an uncomfortable feeling to the passengers.

As opposed to this, when the vehicle is running at a low speed or when the gear position of the transmission is at the low speed gear position, that is, when the speed ratio of the transmission is larger than a predetermined speed ratio, the vibration which is received from the road surface or the surrounding noise become lower. Therefore, if, at this time, cylinder rich control is performed and the output torque of the engine fluctuates, the fluctuations in the output torque of the engine will be transmitted to the passengers as they are without being masked and, therefore, the fluctuations in the output torque of the engine will give the passengers an unpleasant feeling. Note that, in this case, the above-mentioned predetermined speed ratio which acts as the boundary for whether passengers are given an unpleasant feeling is found in advance by experiments etc. Therefore, in the present invention, to prevent passengers from being given an unpleasant feeling when making the air-fuel ratio of the exhaust gas which flows into the exhaust purification catalyst 13 rich, when the air-fuel ratio of the exhaust gas which flows into the exhaust purification catalyst 13 should be made rich, if the speed of the vehicle is lower than the predetermined speed or if the speed ratio of the transmission is larger than a predetermined speed ratio, for example, the gear position of the transmission 25 is at the predetermined low speed gear position, exhaust rich control is performed instead of cylinder rich control if exhaust rich control is possible.

Now then, in the present invention, as explained above, if the speed of the vehicle is lower than the predetermined speed when the air-fuel ratio of the exhaust gas which flows into the exhaust purification catalyst 13 should be made rich, to prevent the passengers from being given an unpleasant feeling, exhaust rich control is performed instead of cylinder rich control if exhaust rich control is possible. In this case, in this embodiment according to the present invention, if the speed of the vehicle is lower than the predetermined speed, for example, is lower than 30 km/h when the air-fuel ratio of the exhaust gas which flows into the exhaust purification catalyst 13 should be made rich, exhaust rich control is performed instead of cylinder rich control if exhaust rich control is possible.

Figure 17:
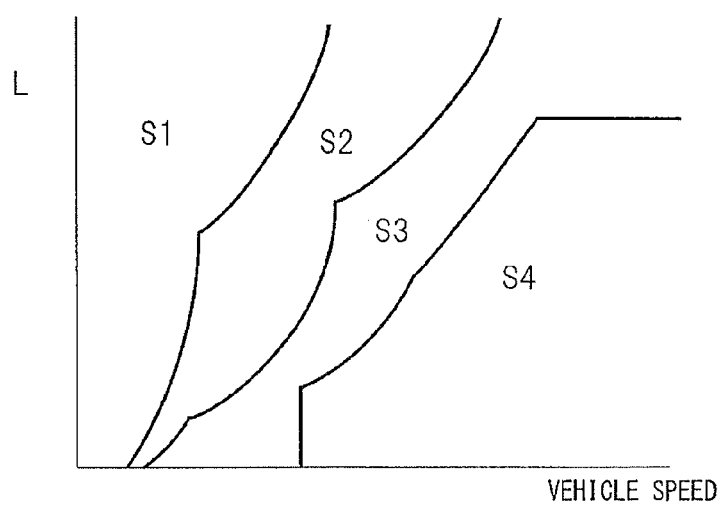
FIG. 17 is a view which shows regions of gear positions of a transmission.

On the other hand, in the present invention, as explained above, if the speed ratio of the transmission is larger than a predetermined speed ratio when the air-fuel ratio of the exhaust gas which flows into the exhaust purification catalyst 13 should be made rich, to prevent the passengers from being given an unpleasant feeling, exhaust rich control is performed instead of cylinder rich control if exhaust rich control is possible. Next, this will be explained a bit more specifically. FIG. 17 shows one example of the regions of gear positions of the transmission 25 which are determined by the amount of depression L of the accelerator pedal 40 and the vehicle speed when using a gear transmission as the automatic transmission 25. Note that, in FIG. 17, S1 shows the region where the gear position of the transmission 25 is the first speed position, that is, the low position, S2 shows the region where the gear position of the transmission 25 is the second speed position, that is, the second position, S3 shows the region where the gear position of the transmission 25 is the third speed position, that is, the third position, and S4 shows the region where the gear position of the transmission 25 is the fourth speed position, that is, the top position. Note that, in this case, in the speed ratio of the transmission 25, the first speed position S1 is the largest and the second speed position S2, third speed position S3, and fourth speed position S4 gradually become smaller in that order.

In this case, in one embodiment according to the present invention, when the air-fuel ratio of the exhaust gas which flows into the exhaust purification catalyst 13 should be made rich, it is considered that the speed ratio of the transmission 25 is larger than the above-mentioned predetermined speed ratio when the gear position of the transmission 25 is at a predetermined low speed gear position, for example, first speed position or second speed position. That is, in this example, if the gear position of the transmission 25 is the first speed position or second speed position when the air-fuel ratio of the exhaust gas which flows into the exhaust purification catalyst 13 should be made rich, exhaust rich control is performed instead of cylinder rich control if exhaust rich control is possible.

On the other hand, the speed ratio when using a continuously variable transmission as the automatic transmission 25 is determined in advance in accordance with the operating state of the engine. Therefore, when a continuously variable transmission is used as the automatic transmission 25, if the speed ratio of the transmission 25 is larger than the predetermined speed ratio when the air-fuel ratio of the exhaust gas which flows into the exhaust purification catalyst 13 should be made rich, exhaust rich control is performed instead of cylinder rich control if exhaust rich control is possible.

Note that, when the vehicle is running at a low speed and the speed ratio of the transmission 25 is larger than a predetermined speed ratio, the vibration which is received from the road surface and the surrounding noise become the lowest. Therefore, at this time, when cylinder rich control is performed and the output torque of the engine fluctuates, the passengers are most given an unpleasant feeling. Therefore, in this embodiment according to the present invention, if the speed of the vehicle is lower than the predetermined speed and the speed ratio of the transmission 25 is larger than the predetermined speed ratio when the air-fuel ratio of the exhaust gas which flows into the exhaust purification catalyst 13 should be made rich, exhaust rich control is performed instead of cylinder rich control if exhaust rich control is possible.

Note that, the hydrocarbons which are fed from the hydrocarbon feed valve 15 are heavy, so if the temperature of the exhaust purification catalyst 13 when hydrocarbons are fed is low, $NO_X$ and $SO_X$ are not reduced well. In this case, to make the $NO_X$ and the $SO_X$ be released well from the exhaust purification catalyst 13 and reduced, when the temperature of the exhaust purification catalyst 13 is sufficiently high, it is necessary to feed hydrocarbons from the hydrocarbon feed valve 15. The temperature of the exhaust purification catalyst 13 at which $NO_X$ or $SO_X$ can be released and reduced well from the exhaust purification catalyst 13 is called the "active temperature". In this embodiment according to the present invention, exhaust rich control is performed instead of cylinder rich control only when the temperature of the exhaust purification catalyst 13 is higher than this active temperature.

Therefore, in this embodiment according to the present invention, when the air-fuel ratio of the exhaust gas which flows into the exhaust purification catalyst 13 should be made rich, if the speed of the vehicle is lower than the predetermined speed and the speed ratio of the transmission 25 is larger than the predetermined speed ratio and the temperature of the exhaust purification catalyst 13 is higher than the predetermined active temperature, exhaust rich control is performed if exhaust rich control is possible. In this embodiment according to the present invention, this active temperature is made the temperature Tm in FIG. 16.

Note that, in this case, in this embodiment according to the present invention, when the air-fuel ratio of the exhaust gas which flows into the exhaust purification catalyst 13 should be made rich, if the speed of the vehicle is higher than the predetermined speed or the speed ratio of the transmission 25 is smaller than the predetermined speed ratio or the temperature of the exhaust purification catalyst is lower than the predetermined active temperature cylinder rich control is performed if cylinder rich control is possible.

Figure 18:
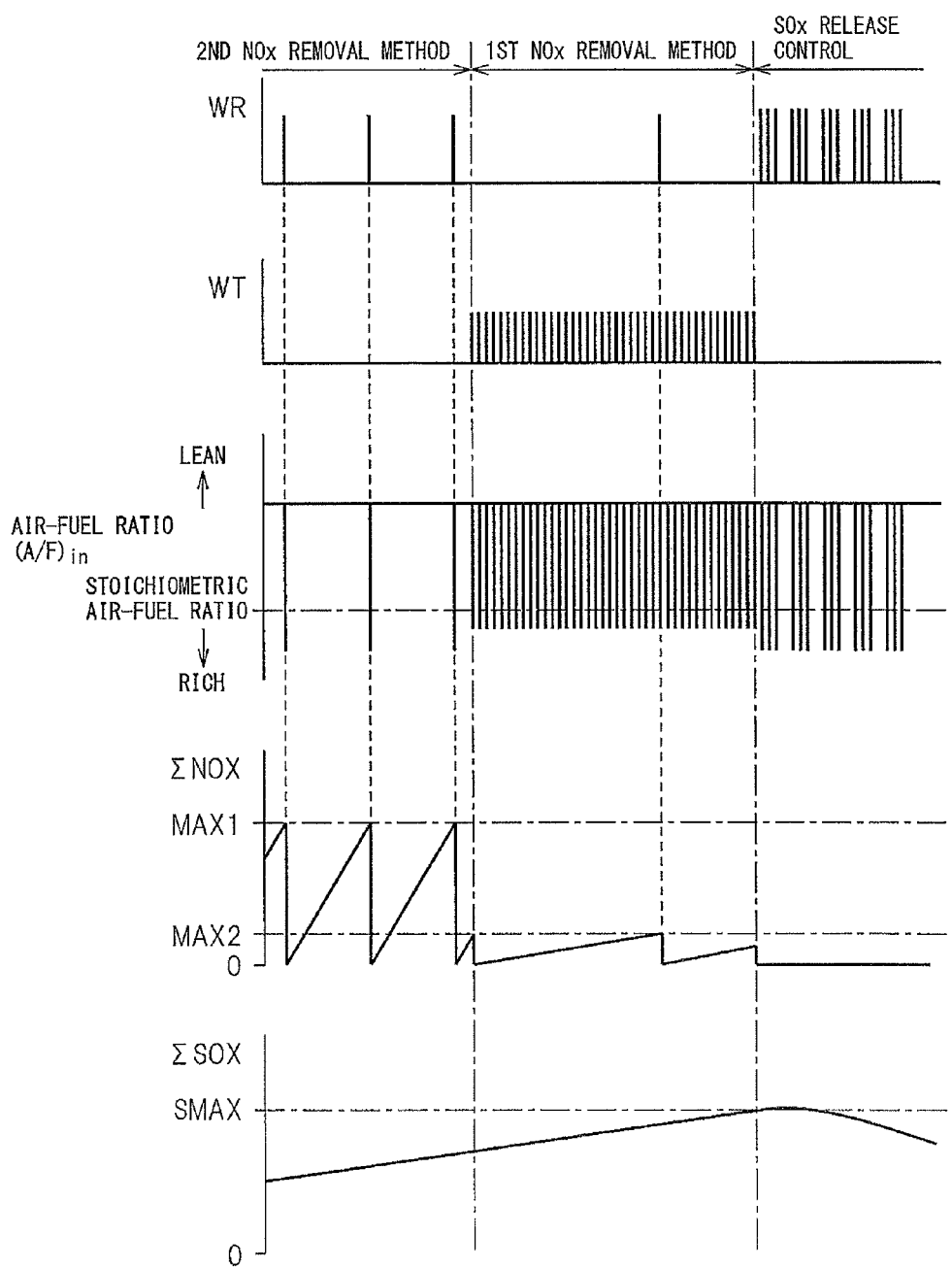
FIG. 18 is a time chart which shows an $NO_X$ purification control.
Figure 19:
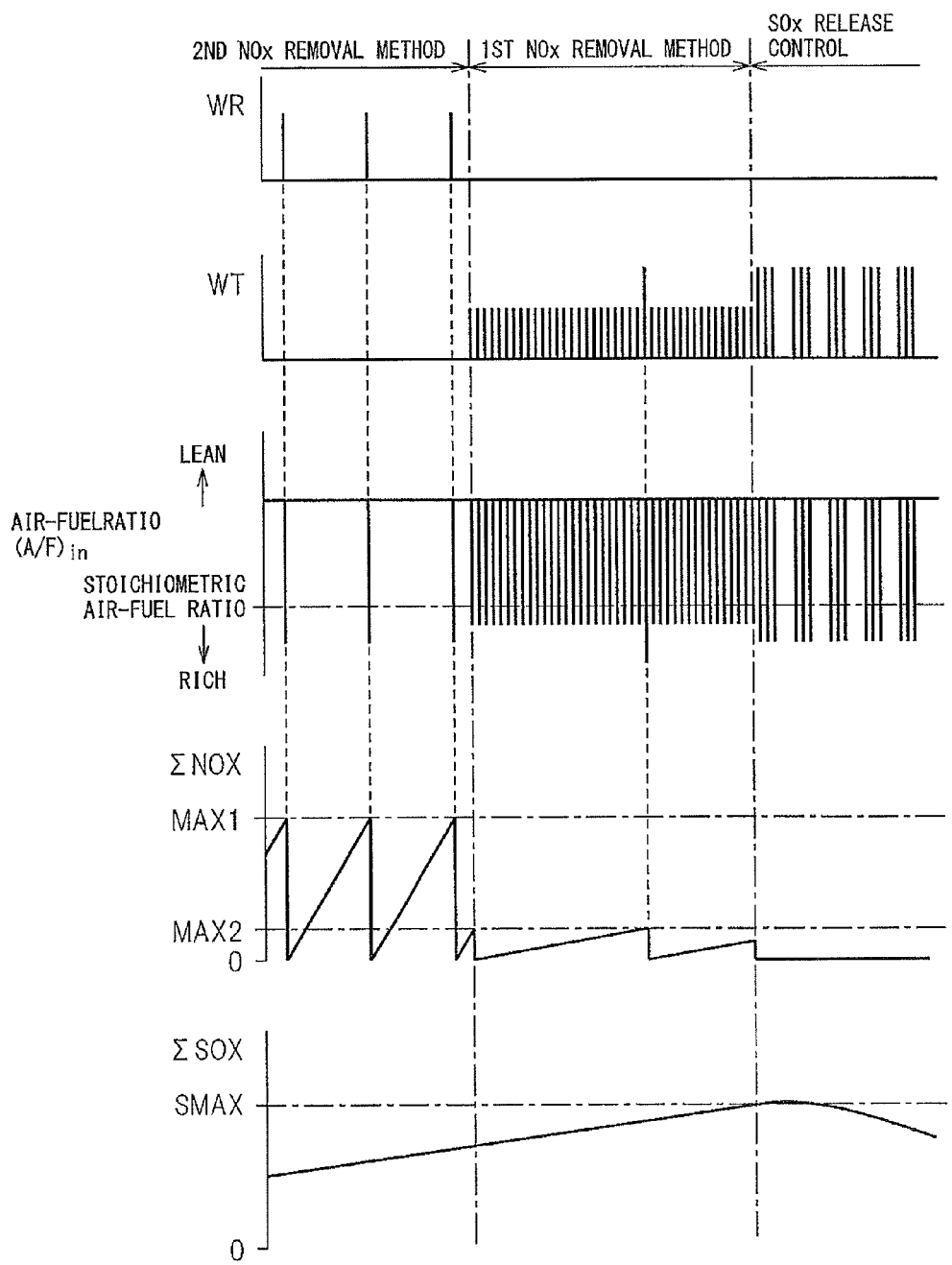
FIG. 19 is a time chart which shows an $NO_X$ purification control.

FIGS. 18 and 19 show time charts of $NO_X$ removal control. These FIGS. 18 and 19 show an additional fuel amount WR from the fuel injector 3, a hydrocarbon amount WT from the hydrocarbon feed valve 15, a change in the air-fuel ratio (A/F) in of the exhaust gas which flows into the exhaust purification catalyst 13, a change in the $NO_X$ storage amount $\Sigma NO_X$ in the exhaust purification catalyst 13, and a change in the $SO_X$ storage amount $\Sigma SOX$ in the exhaust purification catalyst 13. Further, FIGS. 18 and 19 show the first allowable value MAX1 and the second allowable value MAX2 for the stored $NO_X$ amount and the allowable value SMAX for the stored $SO_X$ amount. Note that, FIG. 18 shows the case of using cylinder rich control to make the air-fuel ratio of the exhaust gas which flows into the exhaust purification catalyst 13 rich when making the exhaust purification catalyst 13 release $NO_X$ or $SO_X$, while FIG. 19 shows the case of using exhaust rich control to make the air-fuel ratio of the exhaust gas which flows into the exhaust purification catalyst 13 rich so as to prevent the passengers from being given an unpleasant feeling when making the exhaust purification catalyst 13 release $NO_X$ or $SO_X$.

Now then, as explained above, if the temperature TC of the exhaust purification catalyst 13 exceeds the Tm which is shown in FIG. 16, the $NO_X$ removal action by the second $NO_X$ removal method is switched to the $NO_X$ removal action by the first $NO_X$ removal method. As shown in FIG. 18, when the $NO_X$ removal action by the second $NO_X$ removal method is performed, if the stored $NO_X$ amount $\Sigma NOX$ exceeds the first allowable value MAX1, the air-fuel ratio (A/F) in of the exhaust gas which flows into the exhaust purification catalyst 13 is made rich by cylinder rich control, while when the $NO_X$ removal action by the first $NO_X$ removal method is performed, the hydrocarbon feed valve 15 periodically injects hydrocarbons to make the air-fuel ratio (A/F) in of the exhaust gas which flows into the exhaust purification catalyst 13 periodically rich. The same is true in the case which is shown in FIG. 19.

On the other hand, in the case which is shown in FIG. 18, when the $NO_X$ removal action by the first $NO_X$ removal method is performed, if the stored $NO_X$ amount $\Sigma NOX$ exceeds the second allowable value MAX2, the air-fuel ratio (A/F) in of the exhaust gas which flows into the exhaust purification catalyst 13 is made rich by cylinder rich control. Further, in the case which is shown in FIG. 18, if the stored $SO_X$ amount $\Sigma SOX$ which is stored in the exhaust purification catalyst 13 exceeds the allowable value SMAX, the air-fuel ratio (A/F) in of the exhaust gas which flows into the exhaust purification catalyst 13 is intermittently made rich by cylinder rich control.

As opposed to this, in the case which is shown in FIG. 19, when the $NO_X$ removal action by the first $NO_X$ removal method is performed, if the stored $NO_X$ amount $\Sigma NOX$ exceeds the second allowable value MAX2, the air-fuel ratio (A/F) in of the exhaust gas which flows into the exhaust purification catalyst 13 is made rich by exhaust rich control. Further, in the case which is shown in FIG. 19, if the stored $SO_X$ amount $\Sigma SOX$ which is stored in the exhaust purification catalyst 13 exceeds the allowable value SMAX, the air-fuel ratio (A/F) in of the exhaust gas which flows into the exhaust purification catalyst 13 is made intermittently rich by exhaust rich control.

Figure 20:
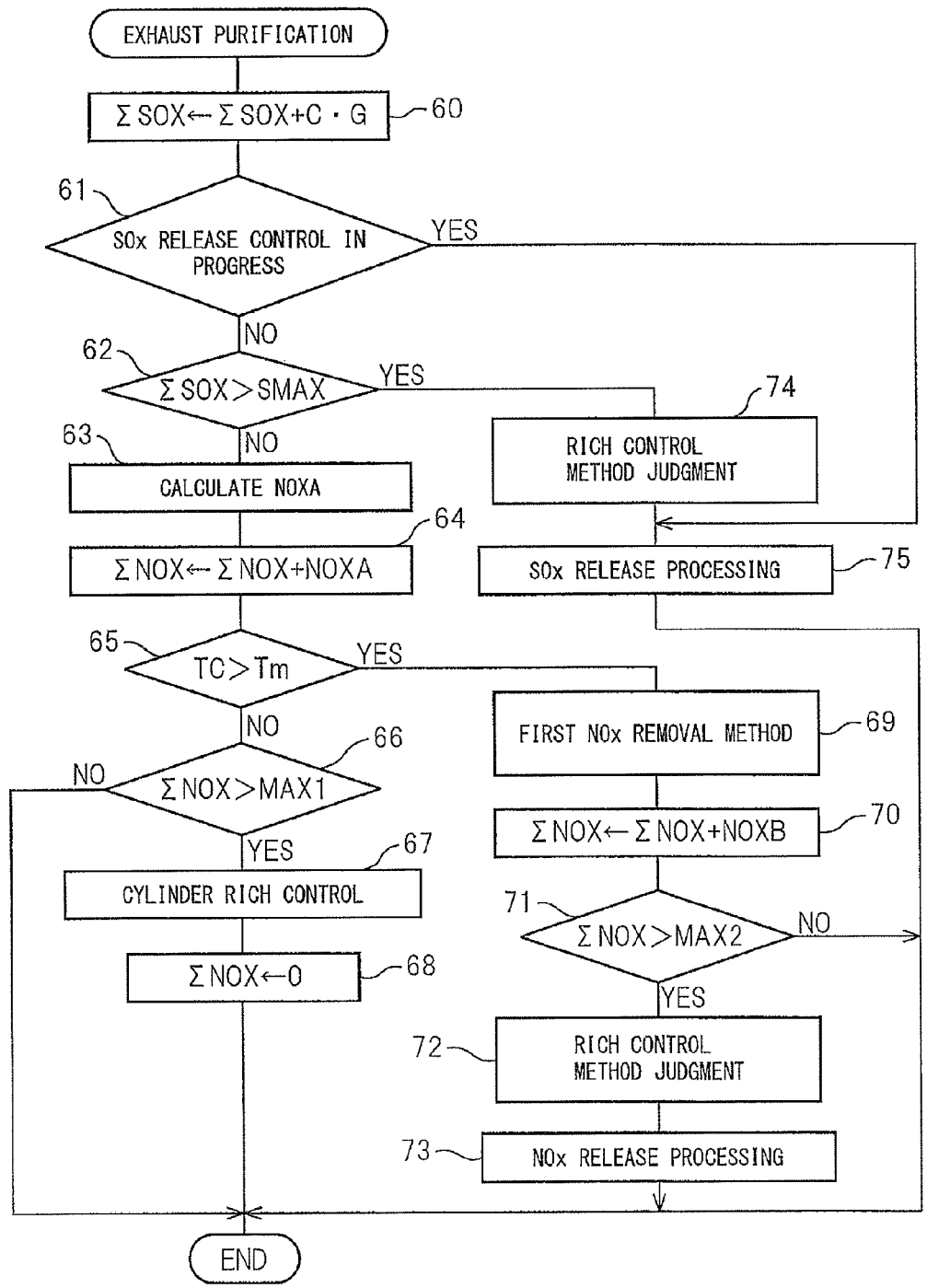
FIG. 20 is a flow chart for an exhaust purification.

FIG. 20 shows an exhaust purification control routine. This routine is executed by interruption every certain time period.

Referring to FIG. 20, first, at step 60, the value of a fuel injection amount Q multiplied with a constant value C is added to $\Sigma SOX$ to calculate the stored $SO_X$ amount $\Sigma SOX$ which is stored in the exhaust purification catalyst 13. Next, at step 61, it is judged if $SO_X$ release control is being performed. When $SO_X$ release control is not being performed, the routine proceeds to step 62 where it is judged if the stored $SO_X$ amount $\Sigma SOX$ exceeds the allowable value SMAX. When the stored $SO_X$ amount $\Sigma SOX$ does not exceed the allowable value SMAX, the routine proceeds to step 63 where the $NO_X$ amount NOXA which is exhausted per unit time is calculated from the map which is shown in FIG. 13. Next, at step 64, the exhausted $NO_X$ amount NOXA is added to the $\Sigma NOX$ to calculate the stored $NO_X$ amount $\Sigma NOX$.

Next, at step 65, it is judged if the temperature TC of the exhaust purification catalyst 13 which is calculated based on the detected values of the temperature sensors 23 and 24 is higher than the catalyst temperature Tm which is shown in FIG. 16. When the catalyst temperature TC is lower than the temperature Tm, it is judged that the $NO_X$ removal action by the second $NO_X$ removal method should be performed, then the routine proceeds to step 66 where the $NO_X$ removal action by the second $NO_X$ removal method is performed. That is, at step 66, it is judged if the stored $NO_X$ amount $\Sigma NOX$ exceeds the first allowable value MAX1. When $\Sigma NOX>MAX1$, the routine proceeds to step 67 where the additional fuel amount WR is calculated from the map which is shown in FIG. 15 and an additional fuel injection action is performed. That is, cylinder rich control is performed. At this time, the $NO_X$ which is stored in the exhaust purification catalyst 13 is released. Next, at step 68, $\Sigma NOX$ is cleared.

On the other hand, when, at step 65, it is judged that the calculated catalyst temperature TC is higher than the catalyst temperature Tm which is shown in FIG. 16, it is judged that the $NO_X$ removal action by the first $NO_X$ removal method should be performed, then the routine proceeds to step 69 where the $NO_X$ removal action by the first $NO_X$ removal method is performed. That is, the hydrocarbon injection amount WT is calculated from FIG. 11A, the hydrocarbon injection period $\Delta T$ is calculated from FIG. 11B, and the calculated injection period $\Delta T$ and injection amount WT are used as the basis to inject hydrocarbons from the hydrocarbon feed valve 15. Next, at step 70, the stored $NO_X$ amount NOXB which is stored per unit time is added to $\Sigma NOX$ so as to calculate the stored $NO_X$ amount $\Sigma NOX$. When the $NO_X$ removal action by the first $NO_X$ removal method is performed, this stored $NO_X$ amount NOXB which is stored per unit time is stored in advance in the form of a map such as shown in FIG. 13.

Figure 21:
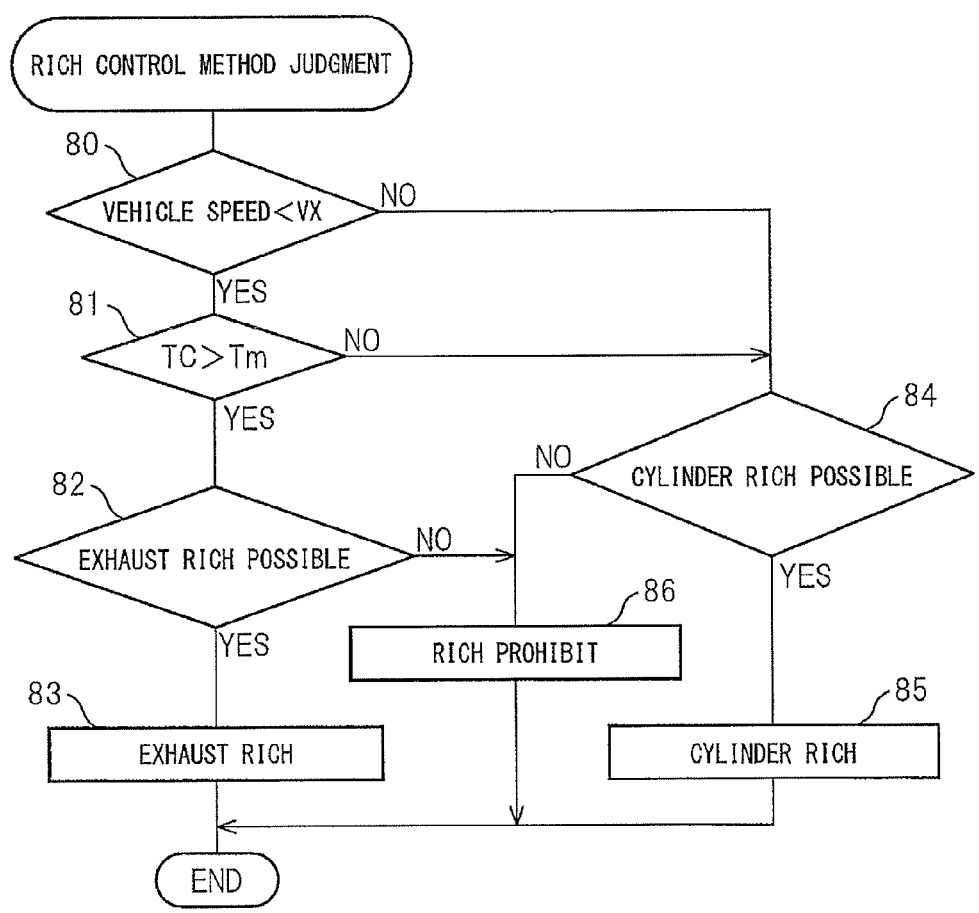
FIG. 21 is a flow chart for judging a rich control method.

Next, at step 71, it is judged if the stored $NO_X$ amount $\Sigma NOX$ exceeds the second allowable value MAX2. When $\Sigma NOX > MAX2$, the routine proceeds to step 72 where it is judged if exhaust rich control should be performed or cylinder rich control should be performed, that is, the judgment of the rich control method which is shown in FIG. 21 is performed. Note that this FIG. 21 shows a first embodiment of judgment of the rich control method.

Figure 24A:
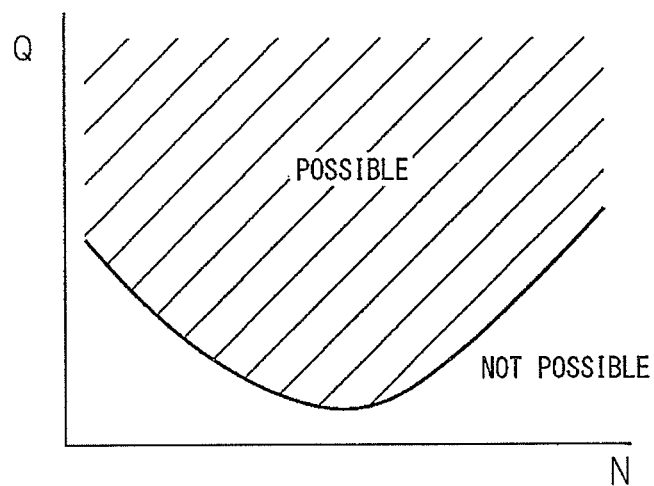
Figure 24B:
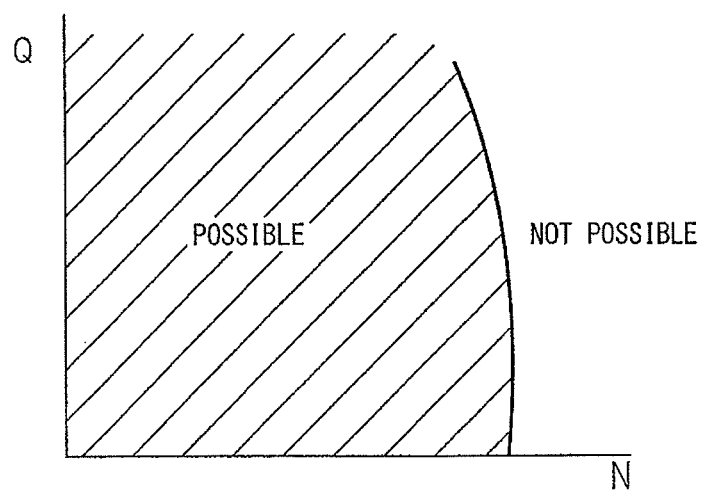

Referring to FIG. 21, in this first embodiment, first, at step 80, it is judged if the speed of the vehicle is lower than a predetermined speed VX, for example, 30 km/h. When the speed of the vehicle is lower than the predetermined speed VX, the routine proceeds to step 81 where it is judged if the temperature of the exhaust purification catalyst 13 is higher than the predetermined active temperature Tm. When it is judged that the temperature of the exhaust purification catalyst 13 is higher than the predetermined active temperature Tm, the routine proceeds to step 82 where it is judged if the operating state of the engine is an operating region enabling exhaust rich control. At this time, the operating region where exhaust rich control is possible is shown by the hatching in FIG. 24B. As shown in FIG. 24B, the operating region where this cylinder rich control is possible is determined by the fuel injection amount Q and the engine speed N. When, at step 82, it is judged that the operating state of the engine is an operating region enabling exhaust rich control, the routine proceeds to step 83 where it is judged if exhaust rich control should be performed.

On the other hand, when, at step 80, it is judged that the speed of the vehicle is higher than the predetermined speed VX or when, at step 81, it is judged that the temperature of the exhaust purification catalyst 13 is lower than the predetermined active temperature, the routine proceeds to step 84 where it is judged if the operating state of the engine is an operating region enabling cylinder rich control. At this time, an operating region in which cylinder rich control is possible is shown by the hatching in FIG. 24A. As shown in FIG. 24A, the operating region where this cylinder rich control is possible is determined by the fuel injection amount Q and the engine speed N.

When it is judged at step 84 that the operating state of the engine is in the operating region enabling cylinder rich control, the routine proceeds to step 85 where it is judged if cylinder rich control should be performed. On the other hand, when, at step 82, it is judged that the operating state of the engine is not in an operating region enabling exhaust rich control or when, at step 84, it is judged that the operating state of the engine is not in an operating region enabling cylinder rich control, the routine proceeds to step 86 where rich control for making the air-fuel ratio of the exhaust gas which flows into the exhaust purification catalyst 13 rich is prohibited.

Returning again to FIG. 20, at step 73, processing is performed to release $NO_X$ from the exhaust purification catalyst 13 in accordance with the judgment in the rich control method at step 72. That is, when it is judged that exhaust rich control should be performed, the air-fuel ratio of the exhaust gas which flows into the exhaust purification catalyst 13 is made rich by exhaust rich control. When it is judged that cylinder rich control should be performed, the air-fuel ratio of the exhaust gas which flows into the exhaust purification catalyst 13 is made rich by cylinder rich control. When rich control is prohibited, rich control for making the air-fuel ratio of the exhaust gas which flows into the exhaust purification catalyst 13 rich is not performed.

On the other hand, when, at step 62, it is judged that the stored $SO_X$ amount $\Sigma SOX$ exceeds the allowable value SMAX, the routine proceeds to step 74 where the judgment of the rich control method which is shown in FIG. 21 is performed. If the judgment of the rich control method is completed, the routine proceeds to step 75. At the next processing cycle, the routine jumps from step 61 to step 75. At step 75, processing is performed to release $SO_X$ from the exhaust purification catalyst 13 in accordance with the judgment in the rich control method at step 74. That is, when it is judged that exhaust rich control should be performed, the air-fuel ratio of the exhaust gas which flows into the exhaust purification catalyst 13 is made rich by exhaust rich control. When it is judged that cylinder rich control should be performed, the air-fuel ratio of the exhaust gas which flows into the exhaust purification catalyst 13 is made rich by cylinder rich control. When rich control is prohibited, rich control for making the air-fuel ratio of the exhaust gas which flows into the exhaust purification catalyst 13 rich is not performed.

Figure 22:
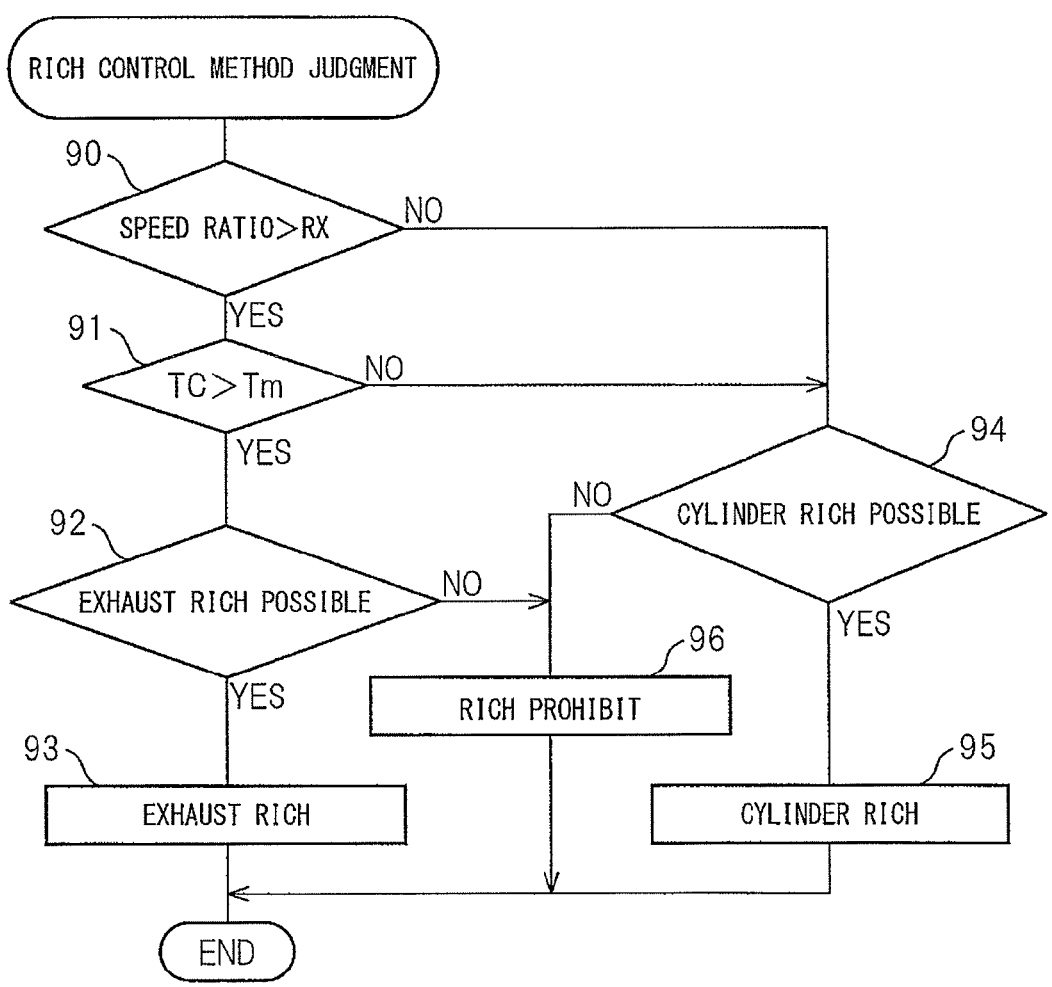
FIG. 22 is a flow chart for judging a rich control method.

FIG. 22 shows a second embodiment of judgment of the rich control method which is performed at step 72 and step 74 of FIG. 20.

That is, referring to FIG. 22, in this second embodiment, first, at step 90, it is judged if the speed ratio of the transmission 25 is larger than a predetermined speed ratio RX. When the speed ratio of the transmission 25 is larger than the predetermined speed ratio RX, the routine proceeds to step 91 where it is judged if the temperature of the exhaust purification catalyst 13 is higher than the predetermined active temperature Tm. When it is judged that the temperature of the exhaust purification catalyst 13 is higher than the predetermined active temperature Tm, the routine proceeds to step 92 where it is judged if the operating state of the engine is in an operating region enabling exhaust rich control which is shown by hatching in FIG. 24B. When it is judged that the operating state of the engine is in an operating region enabling exhaust rich control, the routine proceeds to step 93 where it is judged that exhaust rich control should be performed.

On the other hand, when, at step 90, it is judged that the speed ratio of the transmission 25 is smaller than the predetermined speed ratio RX or when, at step 91, it is judged that the temperature of the exhaust purification catalyst 13 is lower than the predetermined active temperature, the routine proceeds to step 94 where it is judged if the operating state of the engine is in the operating region enabling cylinder rich control which is shown by hatching in FIG. 24A. When it is judged that the operating state of the engine is in the operating region enabling cylinder rich control, the routine proceeds to step 95 where it is judged if cylinder rich control should be performed. On the other hand, when, at step 92, it is judged that the operating state of the engine is not in an operating region enabling exhaust rich control or when, at step 94, it is judged that the operating state of the engine is in the operating region enabling cylinder rich control, the routine proceeds to step 96 where rich control for making the air-fuel ratio of the exhaust gas which flows into the exhaust purification catalyst 13 rich is prohibited.

Figure 23:
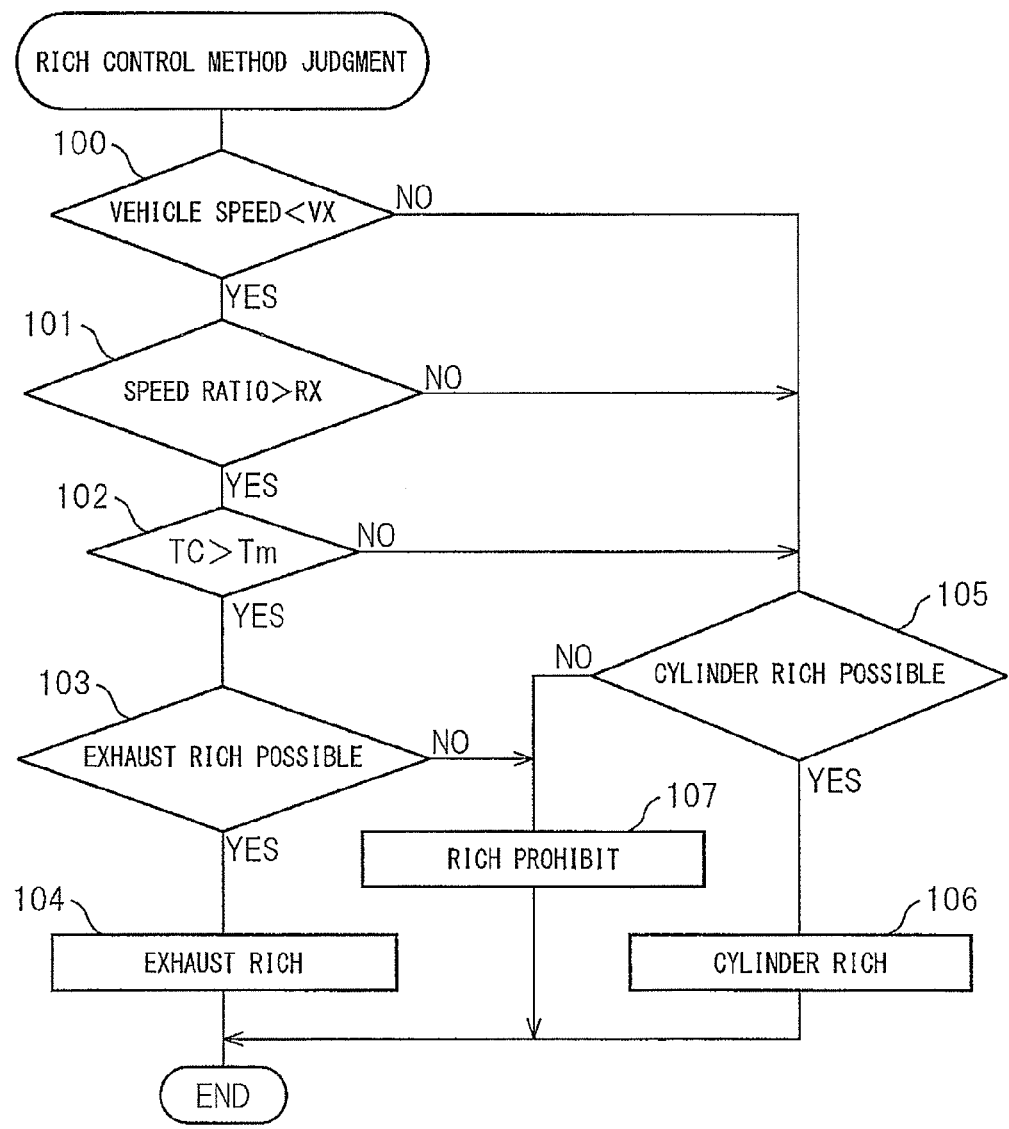
FIG. 23 is a flow chart for judging a rich control method.

FIG. 23 shows a third embodiment of judgment of the rich control method which is performed at step 72 and step 74 of FIG. 20.

That is, referring to FIG. 23, in this third embodiment, first, at step 100, it is judged if the speed of the vehicle is lower than the predetermined speed VX, for example, 30 km/hour. When the speed of the vehicle is lower than the predetermined speed VX, the routine proceeds to step 101 where it is judged if the speed ratio of the transmission 25 is larger than the predetermined speed ratio RX. When the speed ratio of the transmission 25 is larger than the predetermined speed ratio RX, the routine proceeds to step 102 where it is judged if the temperature of the exhaust purification catalyst 13 is higher than the predetermined active temperature Tm. When, at step 102, it is judged that the temperature of the exhaust purification catalyst 13 is higher than the predetermined active temperature Tm, the routine proceeds to step 103 where it is judged if the operating state of the engine is in an operating region enabling exhaust rich control which is shown by hatching in FIG. 24B. When it is judged that the operating state of the engine is in an operating region enabling exhaust rich control, the routine proceeds to step 104 where it is judged that exhaust rich control should be performed.

On the other hand, when, at step 100, it is judged that the speed of the vehicle is higher than the predetermined speed VX or when, at step 101, it is judged that the speed ratio of the transmission 25 is smaller than the predetermined speed ratio RX or when, at step 102, it is judged that the temperature of the exhaust purification catalyst 13 is lower than the predetermined active temperature, the routine proceeds to step 105 where it is judged if the operating state of the engine is in the operating region enabling cylinder rich control which is shown by hatching in FIG. 24A. When it is judged that the operating state of the engine is in the operating region enabling cylinder rich control, the routine proceeds to step 106 where it is judged that cylinder rich control should be performed. On the other hand, when, at step 103, it is judged that the operating state of the engine is not in an operating region enabling exhaust rich control or when, at step 105, it is judged that the operating state of the engine is not in the operating region enabling cylinder rich control, the routine proceeds to step 107 where rich control for making the air-fuel ratio of the exhaust gas which flows into the exhaust purification catalyst 13 rich is prohibited.

On the other hand, as explained up to here, in this embodiment according to the present invention, the first $NO_X$ removal method which removes $NO_X$ which is contained in the exhaust gas by injecting hydrocarbons from the hydrocarbon feed valve 15 by a predetermined range of period and the second $NO_X$ removal method which makes the air-fuel ratio of the exhaust gas which flows into the exhaust purification catalyst 13 rich to make the exhaust purification catalyst 13 release the stored $NO_X$ when the $NO_X$ which is stored in the exhaust purification catalyst 13 exceeds a predetermined first allowable value MAX1 are selectively used. When the temperature of the exhaust purification catalyst 13 is higher than the predetermined setting temperature Tm, the $NO_X$ removal action by the first $NO_X$ removal method is performed. When the temperature of the exhaust purification catalyst 13 is lower than the predetermined setting temperature Tm, the $NO_X$ removal action by the second $NO_X$ removal method is performed. Further, when the $NO_X$ removal action by the first $NO_X$ removal method is performed and the air-fuel ratio of the exhaust gas which flows into the exhaust purification catalyst 13 should be made rich, if the speed, of the vehicle is lower than the predetermined speed VX or the speed ratio of the transmission 25 is larger than the predetermined speed ratio RX exhaust rich control is performed if exhaust rich control is possible.

Note that, in this embodiment according to the present invention, as will be understood from the exhaust purification routine which is shown in FIG. 20, when the $NO_X$ removal action by the second $NO_X$ removal method is performed and the air-fuel ratio of the exhaust gas which flows into the exhaust purification catalyst 13 should be made rich, cylinder rich control is performed.

Note that, as another embodiment, it is also possible to arrange an oxidation catalyst for reforming the hydrocarbons in the engine exhaust passage upstream of the exhaust purification catalyst 13.

REFERENCE SIGNS LIST

4. intake manifold
5. exhaust manifold
7. exhaust turbocharger
12. exhaust pipe
13. exhaust purification catalyst
14. particulate filter
15. hydrocarbon feed valve

The invention claimed is:

1. An exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on an exhaust gas flow surface of the exhaust purification catalyst, basic exhaust gas flow surface parts are formed around the precious metal catalysts, the exhaust purification catalyst has a property of reducing $NO_X$ which is contained in an exhaust gas if making a concentration of hydrocarbons which flow into the exhaust purification catalyst vibrate by within a predetermined range of amplitude and by within a predetermined range of period and has a property of being increased in storage amount of $NO_X$ which is contained in the exhaust gas if making a vibration period of the hydrocarbon concentration longer than the predetermined range, wherein, as rich control for making an air-fuel ratio of the exhaust gas which flows into the exhaust purification catalyst rich, cylinder rich control for generating rich air-fuel ratio combustion gas in a cylinder and exhaust rich control for feeding hydrocarbons from the hydrocarbon feed valve to make air-fuel ratio of the exhaust gas rich can be used, if a speed of a vehicle is lower than a predetermined speed when the air-fuel ratio of the exhaust gas which flows into the exhaust purification catalyst should be made rich, the exhaust rich control is performed if the exhaust rich control is possible, and, if the speed of the vehicle is larger than the predetermined speed when the air-fuel ratio of the exhaust gas which flows into the exhaust purification catalyst should be made rich, the cylinder rich control is performed if the cylinder rich control is possible.

2. The exhaust purification system of an internal combustion engine as claimed in claim 1, wherein if the speed of the vehicle is lower than the predetermined speed and a speed ratio of a transmission is larger than a predetermined speed ratio when the air-fuel ratio of the exhaust gas which flows into the exhaust purification catalyst should be made rich, the exhaust rich control is performed if the exhaust rich control is possible.

3. The exhaust purification system of an internal combustion engine as claimed in claim 2, wherein if the speed of the vehicle is lower than the predetermined speed and the speed ratio of the transmission is larger than the predetermined speed ratio and a temperature of the exhaust purification catalyst is higher than a predetermined active temperature when the air-fuel ratio of the exhaust gas which flows into the exhaust purification catalyst should be made rich, the exhaust rich control is performed if the exhaust rich control is possible.

4. The exhaust purification system of an internal combustion engine as claimed in claim 3, wherein a temperature range of the exhaust purification catalyst and an operating region of the engine where the exhaust rich control is possible are determined in advance, and if the temperature of the exhaust purification catalyst and the operating state of the engine are respectively in the predetermined range of temperature of the exhaust purification catalyst and operating region of the engine enabling the exhaust rich control when the air-fuel ratio of the exhaust gas which flows into the exhaust purification catalyst should be made rich, the exhaust rich control is performed.

5. The exhaust purification system of an internal combustion engine as claimed in claim 3, wherein when the air-fuel ratio of the exhaust gas which flows into the exhaust purification catalyst should be made rich, if the speed of the vehicle is higher than the predetermined speed, the speed ratio of the transmission is smaller than the predetermined speed ratio, or the temperature of the exhaust purification catalyst is lower than the predetermined active temperature, the cylinder rich control is performed if the cylinder rich control is possible.

6. The exhaust purification system of an internal combustion engine as claimed in claim 5, wherein a range of temperature of the exhaust purification catalyst and operating region of the engine where cylinder rich control is possible are determined in advance, and if the temperature of the exhaust purification catalyst and the operating state of the engine are respectively in the predetermined range of temperature of the exhaust purification catalyst and operating state of the engine enabling the cylinder rich control when the air-fuel ratio of the exhaust gas which flows into the exhaust purification catalyst should be made rich, the cylinder rich control is performed.

7. The exhaust purification system of an internal combustion engine as claimed in claim 2, wherein the transmission is comprised of a gear transmission, and if the speed of the vehicle is lower than the predetermined speed and a gear position of the transmission is at a predetermined low speed gear position when the air-fuel ratio of the exhaust gas which flows into the exhaust purification catalyst should be made rich, the exhaust rich control is performed if the exhaust rich control is possible.

8. The exhaust purification system of an internal combustion engine as claimed in claim 1, wherein a first $NO_X$ removal method which removes $NO_X$ which is contained in the exhaust gas by injecting hydrocarbons from the hydrocarbon feed valve by the predetermined range of period and a second $NO_X$ removal method which makes the air-fuel ratio of the exhaust gas which flows into the exhaust purification catalyst rich to make the exhaust purification catalyst release a stored $NO_X$ when $NO_X$ which is stored in the exhaust purification catalyst exceeds a predetermined allowable value are selectively used, a $NO_X$ removal action by the first $NO_X$ removal method is performed when a temperature of the exhaust purification catalyst is higher than a predetermined setting temperature, a $NO_X$ removal action by the second $NO_X$ removal method is performed when the temperature of the exhaust purification catalyst is lower than the predetermined setting temperature, if the speed of the vehicle is lower than the predetermined speed when the $NO_X$ removal action by the first $NO_X$ removal method is performed and the air-fuel ratio of the exhaust gas which flows into the exhaust purification catalyst should be made rich, the exhaust rich control is performed if the exhaust rich control is possible, and if the speed of the vehicle is larger than the predetermined speed when the $NO_X$ removal action by the first $NO_X$ removal method is performed and the air-fuel ratio of the exhaust gas which flows into the exhaust purification catalyst should be made rich, the cylinder rich control is performed if the cylinder rich control is possible.

9. The exhaust purification system of an internal combustion engine as claimed in claim 8, wherein when the $NO_X$ removal action by the second $NO_X$ removal method is performed and the air-fuel ratio of the exhaust gas which flows into the exhaust purification catalyst should be made rich, the cylinder rich control is performed.

10. The exhaust purification system of an internal combustion engine as claimed in claim 1, wherein when the air-fuel ratio of the exhaust gas which flows into the exhaust purification catalyst should be made rich means when $NO_X$ should be released from the exhaust purification catalyst or $SO_X$ should be released from the exhaust purification catalyst.

11. An exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on an exhaust gas flow surface of the exhaust purification catalyst, basic exhaust gas flow surface parts are formed around the precious metal catalysts, the exhaust purification catalyst has a property of reducing $NO_X$ which is contained in the exhaust gas if making a concentration of hydrocarbons which flow into the exhaust purification catalyst vibrate by within a predetermined range of amplitude and by within a predetermined range of period and has a property of being increased in storage amount of $NO_X$ which is contained in an exhaust gas if making a vibration period of the hydrocarbon concentration longer than the predetermined range, wherein, as rich control for making an air-fuel ratio of the exhaust gas which flows into the exhaust purification catalyst rich, cylinder rich control for generating rich air-fuel ratio combustion gas in a cylinder and exhaust rich control for feeding hydrocarbons from the hydrocarbon feed valve to make the air-fuel ratio of the exhaust gas rich can be used, if a speed ratio of a transmission is larger than a predetermined speed ratio when the air-fuel ratio of the exhaust gas which flows into the exhaust purification catalyst should be made rich, the exhaust rich control is performed if the exhaust rich control is possible, and, if the speed ratio of the transmission is smaller than the predetermined speed ratio when the air-fuel ratio of the exhaust gas which flows into the exhaust purification catalyst should be made rich, the cylinder rich control is performed if the cylinder rich control is possible.

12. The exhaust purification system of an internal combustion engine as claimed in claim 11, wherein a temperature range of the exhaust purification catalyst and an operating region of the engine where the exhaust rich control is possible are determined in advance, and if the temperature of the exhaust purification catalyst and the operating state of the engine are respectively in the predetermined range of temperature of the exhaust purification catalyst and operating region of the engine enabling the exhaust rich control when the air-fuel ratio of the exhaust gas which flows into the exhaust purification catalyst should be made rich, the exhaust rich control is performed.

13. The exhaust purification system of an internal combustion engine as claimed in claim 11, wherein a temperature range of the exhaust purification catalyst and an operating region of the engine where cylinder rich control is possible are determined in advance, and if the temperature of the exhaust purification catalyst and the operating state of the engine are respectively in the predetermined range of temperature of the exhaust purification catalyst and operating region of the engine enabling the cylinder rich control when the air-fuel ratio of the exhaust gas which flows into the exhaust purification catalyst should be made rich, the cylinder rich control is performed.

14. The exhaust purification system of an internal combustion engine as claimed in claim 11, wherein a first $NO_X$ removal method which removes $NO_X$ which is contained in the exhaust gas by injecting hydrocarbons from the hydrocarbon feed valve by the predetermined range of period and a second $NO_X$ removal method which makes the air-fuel ratio of the exhaust gas which flows into the exhaust purification catalyst rich to make the exhaust purification catalyst release a stored $NO_X$ when $NO_X$ which is stored in the exhaust purification catalyst exceeds a predetermined allowable value are selectively used, when a $NO_X$ removal action by the first $NO_X$ removal method is performed a temperature of the exhaust purification catalyst is higher than a predetermined setting temperature, a $NO_X$ removal action by the second $NO_X$ removal method is performed when the temperature of the exhaust purification catalyst is lower than the predetermined setting temperature, if the speed ratio of the transmission is larger than the predetermined speed ratio when the $NO_X$ removal action by the first $NO_X$ removal method is performed and the air-fuel ratio of the exhaust gas which flows into the exhaust purification catalyst should be made rich, the exhaust rich control is performed if the exhaust rich control is possible, and if the speed ratio of the transmission is smaller than the predetermined speed ratio when the $NO_X$ removal action by the first $NO_X$ removal method is performed and the air-fuel ratio of the exhaust gas which flows into the exhaust purification catalyst should be made rich, the cylinder rich control is performed if the cylinder rich control is possible.

15. The exhaust purification system of an internal combustion engine as claimed in claim 14, wherein when the $NO_X$ removal action by the second $NO_X$ removal method is performed and the air-fuel ratio of the exhaust gas which flows into the exhaust purification catalyst should be made rich, the cylinder rich control is performed.

16. The exhaust purification system of an internal combustion engine as claimed in claim 11, wherein when the air-fuel ratio of the exhaust gas which flows into the exhaust purification catalyst should be made rich means when $NO_X$ should be released from the exhaust purification catalyst or $SO_X$ should be released from the exhaust purification catalyst.

* * * * *